United States Patent
Wu et al.

(10) Patent No.: US 10,616,019 B2
(45) Date of Patent: Apr. 7, 2020

(54) SIGNAL SENDING METHOD, TERMINAL DEVICE, AND NETWORK DEVICE

(71) Applicant: Huawei Technologies Co., Ltd., Shenzhen, Guangdong (CN)

(72) Inventors: Zuomin Wu, Shenzhen (CN); Sha Ma, Beijing (CN); Lei Guan, Beijing (CN); Yan Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/146,099

(22) Filed: Sep. 28, 2018

(65) Prior Publication Data

US 2019/0036753 A1    Jan. 31, 2019

Related U.S. Application Data

(63) Continuation of application No. PCT/CN2016/078224, filed on Mar. 31, 2016.

(51) Int. Cl.
*H04L 27/26* (2006.01)
*H04L 5/00* (2006.01)

(52) U.S. Cl.
CPC .......... *H04L 27/2607* (2013.01); *H04L 5/001* (2013.01); *H04L 5/0039* (2013.01);
(Continued)

(58) Field of Classification Search
None
See application file for complete search history.

(56) References Cited

U.S. PATENT DOCUMENTS

2012/0314652 A1    12/2012    Ahn et al.
2018/0115981 A1*   4/2018     Kim ................. H04W 72/1215
                                                              370/328
(Continued)

FOREIGN PATENT DOCUMENTS

CN    101119351 A    2/2008
CN    101170532 A    4/2008
(Continued)

OTHER PUBLICATIONS

Panasonic, "PRACH on Unlicensed Carriers", 3GPP TSG-RAN WG1 Meeting 84, Feb. 15-19, 2016, 1 page, R1-160797.
(Continued)

*Primary Examiner* — Anh Vu H Ly
(74) *Attorney, Agent, or Firm* — Fish & Richardson P.C.

(57) ABSTRACT

A terminal device generates a first signal. The first signal includes M first sequences, a length of each first sequence of the M first sequences is Z and each first sequence is obtained based on at least one second sequence whose length is L, the second sequence is a sequence in an orthogonal sequence group, the orthogonal sequence group includes at least two second sequences whose lengths are L, and any two second sequences in the orthogonal sequence group are orthogonal. The terminal device sends the first signal. The first signal occupies M symbols in time domain, and occupies N frequency domain units in a frequency domain. Each frequency domain unit of the N frequency domain units includes K contiguous subcarriers, the first signal occupies L contiguous subcarriers in each frequency domain unit, and the M sequences are in a one-to-one correspondence to the M symbols, where $Z=N \cdot L$.

20 Claims, 10 Drawing Sheets

(52) U.S. Cl.
CPC ......... *H04L 5/0041* (2013.01); *H04L 5/0053* (2013.01); *H04L 27/2613* (2013.01)

(56) References Cited

U.S. PATENT DOCUMENTS

| | | | | |
|---|---|---|---|---|
| 2018/0192355 A1* | 7/2018 | Kim | ................ | H04J 11/00 370/328 |
| 2018/0213386 A1* | 7/2018 | Kim | ................ | H04J 11/0073 370/328 |
| 2018/0302195 A1* | 10/2018 | Kim | ................ | H04L 1/18 370/328 |
| 2018/0302203 A1* | 10/2018 | Kim | ................ | H04J 11/00 370/328 |
| 2019/0029053 A1 | 1/2019 | Quan et al. | | |
| 2019/0037411 A1* | 1/2019 | Wu | ................ | H04W 16/14 370/328 |
| 2019/0098605 A1* | 3/2019 | Seo | ................ | H04L 5/0055 370/328 |

FOREIGN PATENT DOCUMENTS

| | | |
|---|---|---|
| EP | 3417558 A2 | 12/2018 |
| WO | 2015165031 A1 | 11/2015 |
| WO | 2016022305 A1 | 2/2016 |
| WO | 2017/164626 A2 | 9/2017 |

OTHER PUBLICATIONS

NTT Docomo, Inc., "Discussion on PRACH for eLAA UL", 3GPP TSG RAN WG1 Meeting #84, Feb. 15-19, 2016, 5 pages, R1-160950.
3GPP TS 36.211 V13.1.0 (Mar. 2016), 3rd Generation Partnership Project; Technical Specification Group Radio Access Network; Evolved Universal Terrestrial Radio Access (E-UTRA); Physical channels and modulation(Release 13), dated Mar. 29, 2016, 155 pages.
Office Action issued in Chinese Application No. 201680084046.3 dated Dec. 2, 2019, 5 pages.
Search Report issued in Chinese Application No. 201680084046.3 dated Nov. 22, 2019, 2 pages.

* cited by examiner

SIGNAL SENDING METHOD, TERMINAL DEVICE, AND NETWORK DEVICE

CROSS-REFERENCE TO RELATED APPLICATIONS

This application is a continuation of International Application No. PCT/CN2016/078224, filed on Mar. 31, 2016, the disclosure of which is hereby incorporated by reference in its entirety.

TECHNICAL FIELD

The present disclosure relates to the communication field, and more specifically, relates to a signal sending method, a terminal device, and a network device.

BACKGROUND

In the wireless communication field, spectrum resources are mainly categorized into licensed spectrum resources and unlicensed spectrum resources. In an existing Long Term Evolution (LTE) system, spectrum resources used by an operator are mainly licensed spectrum resources. As a quantity of users of a mobile communication network increases and the users' requirements on a communication rate and service quality get higher, existing licensed spectrum resources can hardly meet requirements of existing services of the operator. Having considered that new licensed spectra are high in price and short in resources, operators start to pay attention to unlicensed spectrum resources, expecting to achieve the purpose of offloading network capacities and improving service quality by using unlicensed spectrum resources.

Different countries or regions have specific requirements on use of unlicensed spectrum resources. For example, when sending a signal on an unlicensed spectrum resource, a device should follow a resource contention method of listen before talk (LBT). A maximum transmit power or a maximum transmit power spectrum density used by a device to send a signal on an unlicensed spectrum resource is restricted by laws and regulations. When a device sends a signal on an unlicensed spectrum resource, the signal needs to occupy 80% of a channel bandwidth.

In an existing LTE system, a terminal device (for example, User Equipment, UE) needs to send a random access preamble sequence on a physical random access channel (PRACH) resource during a random access process. A PRACH occupies six contiguous resource blocks (RB) in frequency domain. If an existing PRACH structure is used on an unlicensed spectrum resource, due to restrictions of laws and regulations, the requirement that the signal needs to occupy 80% of the channel bandwidth cannot be met, and a transmit power of the random access preamble sequence is restricted by a maximum transmit power spectrum density.

Therefore, to meet the foregoing requirements, a new PRACH structure and a new random access preamble sequence need to be designed.

SUMMARY

This application provides a method for transmitting a reference signal, a terminal device, and a network device, so as to improve demodulation performance of a random access preamble sequence that occupies a discrete frequency domain resource.

According to a first aspect, this application provides a signal sending method. The method includes: generating, by a terminal device, a first signal, where the first signal includes M first sequences, a length of each first sequence of the M first sequences is Z and each first sequence is obtained based on at least one second sequence whose length is L, the second sequence is a sequence in an orthogonal sequence group, the orthogonal sequence group includes at least two second sequences whose lengths are L, and any two second sequences in the orthogonal sequence group are mutually orthogonal; and sending, by the terminal device, the first signal, where the first signal occupies M symbols in time domain, the first signal occupies N frequency domain units in frequency domain, each frequency domain unit of the N frequency domain units includes K contiguous subcarriers, the first signal occupies L contiguous subcarriers in each frequency domain unit, and the M sequences are in a one-to-one correspondence to the M symbols, where $Z=N \cdot L$, $M \geq 1$, $N \geq 2$, $K \geq 12$, and $1 \leq L \leq K$; Z, M, N, K, and L are all natural numbers, and when $M>1$, the M symbols are contiguous symbols.

According to a second aspect, this application provides a signal sending method. The method includes: generating, by a network device, a second signal, where the second signal is used to receive a first signal sent by a terminal device, the second signal includes at least M first sequences, a length of each first sequence of the M first sequences is Z and each first sequence is obtained based on at least one second sequence whose length is L, the second sequence is a sequence in an orthogonal sequence group, the orthogonal sequence group includes at least two second sequences whose lengths are L, and any two second sequences in the orthogonal sequence group are mutually orthogonal; and receiving, by the network device based on the second signal, the first signal sent by the terminal device, where the first signal occupies M symbols in time domain, the first signal occupies N frequency domain units in frequency domain, each frequency domain unit includes K contiguous subcarriers, the first signal occupies L contiguous subcarriers in each frequency domain unit, and the M sequences are in a one-to-one correspondence to the M symbols, where $Z=N \cdot L$, $M \geq 1$, $N \geq 2$, $K \geq 12$, and $1 \leq L \leq K$, where Z, M, N, K, and L are all natural numbers, and when $M>1$, the M symbols are contiguous symbols.

Optionally, in some implementations, each first sequence of the M first sequences is obtained based on a third sequence whose length is Z and any second sequence of the at least one second sequence.

Optionally, in some implementations, a bandwidth of each frequency domain unit of the N frequency domain units is 180000 Hz, and that each frequency domain unit includes K contiguous subcarriers includes at least one of the following cases: each frequency domain unit includes 144 contiguous subcarriers, where a bandwidth of each subcarrier is 1250 Hz; each frequency domain unit includes 72 contiguous subcarriers, where a bandwidth of each subcarrier is 2500 Hz; each frequency domain unit includes 36 contiguous subcarriers, where a bandwidth of each subcarrier is 5000 Hz; each frequency domain unit includes 24 contiguous subcarriers, where a bandwidth of each subcarrier is 7500 Hz; and each frequency domain unit includes 12 contiguous subcarriers, where a bandwidth of each subcarrier is 15000 Hz.

Optionally, in some implementations, that the first signal occupies M symbols in time domain includes at least one of the following cases: the first signal occupies 1 symbol in time domain; the first signal occupies 2 contiguous symbols in time domain; the first signal occupies 4 contiguous symbols in time domain; the first signal occupies 12 contiguous symbols in time domain; and the first signal occupies 14 contiguous symbols in time domain.

Optionally, in some implementations, a length of a cyclic prefix CP of at least the $1^{st}$ symbol of the M symbols is greater than 160·Ts, where Ts=1/(15000×2048) seconds.

Optionally, in some implementations, each frequency domain unit of the N frequency domain units includes 12 contiguous subcarriers, a bandwidth of each subcarrier is 15000 Hz, the first signal occupies 10 contiguous subcarriers located at a central location of each frequency domain unit in frequency domain, and one subcarrier located on either side of two sides of the central location of each frequency domain unit does not carry a signal.

Optionally, in some implementations, each frequency domain unit of the N frequency domain units includes 144 contiguous subcarriers, a bandwidth of each subcarrier is 1250 Hz, the first signal occupies 1 symbol in time domain, the first signal occupies 120 contiguous subcarriers located at a central location of each frequency domain unit in frequency domain, and each 12 contiguous subcarriers located on either side of two sides of the central location of each frequency domain unit do not carry a signal.

Optionally, in some implementations, S symbols of the M symbols carry uplink control information, and the uplink control information includes at least one type of hybrid automatic repeat request HARQ information, channel state information, and scheduling request information, where M>S, and M>1.

Optionally, in some implementations, the uplink control information is HARQ information, the N frequency domain units include a first frequency domain unit and a second frequency domain unit, the first frequency domain unit and the second frequency domain unit respectively carry first HARQ information and second HARQ information, and the first HARQ information and the second HARQ information correspond to different carriers or subframes.

Optionally, in some implementations, frequency domain spacings between any two adjacent frequency domain units of the N frequency domain units are equal, and N>2.

According to a third aspect, this application provides a terminal device for transmitting a signal, which is configured to perform the method according to the first aspect or any possible implementation of the first aspect. Specifically, the terminal device includes a unit that is configured to perform the method according to the first aspect or any possible implementation of the first aspect.

According to a fourth aspect, this application provides a network device for transmitting a reference signal, where the network device is configured to perform the method according to the second aspect or any possible implementation of the second aspect. Specifically, the network device includes a unit that is configured to perform the method according to the second aspect or any possible implementation of the second aspect.

According to a fifth aspect, this application provides a terminal device for transmitting a signal. The terminal device includes a processor, a transceiver, and a memory. Optionally, the terminal device further includes a bus system. The transceiver, the memory, and the processor are connected by using the bus system. The memory is configured to store an instruction. The processor is configured to execute the instruction stored in the memory, to control the transceiver to receive or send a signal. When the processor executes the instruction stored in the memory, the processor is enabled to perform the method according to the first aspect or any possible implementation of the first aspect.

According to a sixth aspect, this application provides a network device for transmitting a signal. The network device includes a processor, a transceiver, and a memory. Optionally, the terminal device further includes a bus system. The transceiver, the memory, and the processor are connected by using the bus system. The memory is configured to store an instruction. The processor is configured to execute the instruction stored in the memory, to control the transceiver to receive or send a signal. When the processor executes the instruction stored in the memory, the processor is enabled to perform the method according to the second aspect or any possible implementation of the second aspect.

According to a seventh aspect, this application provides a computer readable medium, configured to store a computer program. The computer program includes an instruction for performing the method according to the first aspect or any possible implementation of the first aspect.

According to an eighth aspect, this application provides a computer readable medium, configured to store a computer program. The computer program includes an instruction for performing the method according to the second aspect or any possible implementation of the second aspect.

This application provides the signal sending method, the terminal device, and the network device, so as to improve demodulation performance of a random access preamble sequence that occupies a discrete frequency domain resource.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

Figure 1:
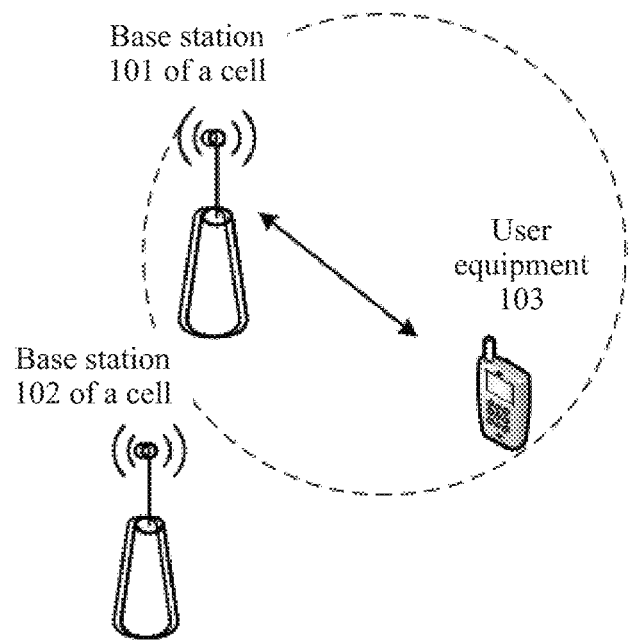
FIG. 1 is an application scenario which is applicable for a reference signal transmission method in an embodiment of the present disclosure.

The following describes the technical solutions in the embodiments of the present disclosure with reference to the accompanying drawings in the embodiments of the present disclosure. Apparently, the described embodiments are some rather than all of the embodiments of the present disclosure. All other embodiments obtained by persons of ordinary skill in the art based on the embodiments of the present disclosure without creative efforts shall fall within the protection scope of the present disclosure.

The technical solutions in the embodiments of the present disclosure may be applied to various communication systems in a wireless cellular network, such as a Global System for Mobile Communications (GSM), a Code Division Multiple Access (CDMA) system, a Wideband Code Division Multiple Access (WCDMA) system, a general packet radio service (GPRS) system, an LTE system, a Universal Mobile Telecommunications System (UMTS), and a future 5G communication system. This is not limited in the embodiments of the present disclosure.

The technical solutions in the embodiments of the present disclosure are mainly applied to a Long Term Evolution (LTE) system and its evolved system, especially a Licensed-Assisted Access Using LTE (LAA-LTE) system or a carrier aggregation (CA) SA-LTE system. In a communication system to which the embodiments of the present disclosure are applied, involved network elements are an access network device (also referred to as a network device) and a terminal device (also referred to as user equipment).

Each embodiment of the embodiments of the present disclosure is described with reference to a terminal device. The terminal device (UE) may be referred to as a terminal, a mobile station (MS), a mobile terminal, or the like. The terminal device may communicate with one or more core networks by using a radio access network (RAN). For example, the terminal device may be a mobile phone (also referred to as a "cellular" phone) or a computer having a mobile terminal. For example, the terminal device may also be a portable, pocket-sized, handheld, computer built-in, or in-vehicle mobile apparatus and a terminal device in a future 5G network. These devices exchange voice and/or data with the radio access network.

Each embodiment of the embodiments of the present disclosure is described with reference to a network device. The network device may be an evolved NodeB (which may be referred to as an eNB or e-NodeB for short), a macro base station, a micro base station (also referred to as a "small cell"), a pico base station, an access point (AP) or a transmission point (TP), or the like in an LTE system or its evolved system, especially an LAA-LTE system or an SA-LTE system.

A symbol is mentioned in the technical solutions in the embodiments of the present disclosure and includes at least a cyclic prefix (CP) part and an information segment part. The information segment part includes all information of a symbol. The CP is a duplicate of some signals in the information segment. The symbol mentioned in the technical solutions in the embodiments of the present disclosure may be an orthogonal frequency division multiplexing (OFDM) symbol, or may be a Single Carrier-Frequency Division Multiple Access (SC-FDMA) symbol, or may be a symbol occupied by a random access preamble sequence. Alternatively, the symbol mentioned in the technical solutions in the embodiments of the present disclosure may be a symbol of another type of communication. This is not limited in the present disclosure.

A physical channel carries data information from higher layers. The physical channel may be a physical downlink shared channel (PDSCH), a physical downlink control channel (PDCCH), a physical control format indicator channel (PCFICH), a physical hybrid ARQ indicator channel (PHICH), an enhanced-physical downlink control channel (EPDCCH), a physical uplink shared channel (PUSCH), a physical uplink control channel (PUCCH), a physical random access channel (PRACH), or the like, or a channel that is newly introduced into a standard and that has a same function but a different name; or may be a combination of the foregoing channels.

A reference signal (RS) is used at a physical layer, but does not carry data information from higher layers, for example, a cell-specific reference signal (CRS) for downlink transmission, a UE-specific reference signal (UE-RS) for downlink transmission or a group-specific reference signal (GRS) for downlink transmission, a demodulation reference signal (DMRS) for uplink transmission, or a sounding reference signal (SRS). The RS is mainly used for channel estimation, physical channel demodulation, radio resource management (RRM) measurement, channel state information measurement, and the like.

From the perspective of frequency, a minimum unit of a resource is a subcarrier. A bandwidth of one resource block (RB) in frequency domain is 180000 Hz. When a subcarrier spacing is 15000 Hz, one RB includes 12 subcarriers; when a subcarrier spacing is 1250 Hz, one RB includes 144 subcarriers; or when a subcarrier spacing is 7500 Hz, one RB includes 24 subcarriers.

From the perspective of time, one radio frame is 10 ms in duration and includes 10 subframes, where one subframe is 1 ms in duration. When a radio resource is used for transmission on a physical channel, except a PRACH, in uplink or downlink, there are two subframe formats: a normal cyclic prefix (NCP) and an extended cyclic prefix (ECP). One NCP subframe includes 14 symbols, and one ECP subframe includes 12 symbols. An information segment length of each symbol is $2048 \cdot T_s$, where $T_s$ is a minimum time unit, and $T_s=1/(15000 \times 2048)$ seconds. In the NCP subframe, CP lengths of a symbol 0 and a symbol 7 are $160 \cdot T_s$, and CP lengths of other symbols are $144 \cdot T_s$. In the ECP subframe, a CP length of each symbol is $512 \cdot T_s$. A random access preamble sequence transmitted on a PRACH may include five formats shown in Table 1. In Table 1, an occupied time in transmission further includes protection duration.

TABLE 1

| Sequence format | Cyclic prefix | Information segment | Occupied time in transmission |
|---|---|---|---|
| 0 | $3168 \cdot T_s$ | $24576 \cdot T_s$ | $30720 \cdot T_s$ |
| 1 | $21024 \cdot T_s$ | $24576 \cdot T_s$ | $2 \cdot 30720 \cdot T_s$ |

TABLE 1-continued

| Sequence format | Cyclic prefix | Information segment | Occupied time in transmission |
|---|---|---|---|
| 2 | 6240 · Ts | 2 · 24576 · Ts | 2 · 30720 · Ts |
| 3 | 21024 · Ts | 2 · 24576 · Ts | 3 · 30720 · Ts |
| 4 | 448 · Ts | 4096 · Ts | 4832 · Ts |

When a signal is sent on an unlicensed spectrum resource, in some countries or regions, due to restrictions of laws and regulations, a signal sent by a device needs to occupy 80% of a channel bandwidth, and a transmit power of the signal is restricted by a maximum transmit power spectrum density in a frequency band. In the case of downlink transmission, a network device may schedule a plurality of terminal devices in frequency domain to meet the foregoing requirements. In the case of uplink transmission, if multi-user frequency division multiplexing needs to be supported, each terminal device needs to meet the foregoing requirements. In PUSCH or PUCCH transmission of the terminal device, RBs at different locations in the frequency band may be scheduled to meet the requirements. However, a prior-art PRACH occupies six RBs in frequency domain. To meet this requirement, the PRACH also needs to be mapped to an entire system frequency band in a discrete manner.

In a possible manner, an uplink PUSCH or PUCCH or PRACH is mapped to the entire system frequency band in a discrete manner. For example, assuming that a system bandwidth is 20 MHz and that the entire frequency band includes 100 RBs, the 100 RBs may be classified into 10 clusters, where each cluster includes 10 contiguous RBs. RBs at same relative locations in the clusters may form a new group, where each group includes 10 RBs that are discrete in frequency domain. During PUSCH, PUCCH, or PRACH resource allocation, a group is used as a unit, to ensure that each uplink physical channel can meet a bandwidth occupation requirement.

In such a resource allocation structure, one manner is to map an existing random access preamble sequence to discrete RBs. However, in this mapping manner, it is highly possible that a bandwidth occupied by the random access preamble sequence in frequency domain exceeds a coherence bandwidth of a channel. As a result, different random access preamble sequences are compromised in terms of orthogonality after undergoing channel fading. Another manner is to replace random access preamble sequence sending with uplink SRS sending. However, a purpose of sending a random access preamble sequence is to measure a round-trip delay of signal transmission between a terminal device and a base station. Assuming that a coverage area of a cell in an unlicensed spectrum is 1.5 kilometers at most, a length of a CP needs to be at least 10 μs. Currently, only the NCP subframe format is supported on an unlicensed frequency spectrum resource. In this subframe format, a CP of a symbol has a maximum length of 160·Ts, to be specific, approximately 5.2 μs, which cannot meet the requirement.

Therefore, a new PRACH channel structure and a new random access preamble sequence need to be designed.

FIG. 1 shows an application scenario to which the solutions provided in the present disclosure may be applied. As shown in FIG. 1, this scenario includes a base station 101 of a cell, a base station 102 of a cell adjacent to the base station 101 of a cell, and a terminal device 103 that is located in a coverage area of the base station 101 of a cell and that communicates with the base station 101 of a cell. The base station 101 of a cell and the terminal device 103 are specifically communication devices that support communication using an unlicensed spectrum resource and that have fixed frame boundaries or subframe boundaries or symbol boundaries. A frequency band supported by the base station 102 of a cell may be the same as that of the base station 101 of a cell. The base station 102 of a cell may be a communication device of the same type as the base station 101 of a cell or may be a communication device of a different type from the base station 101 of a cell. For example, the base station 101 of a cell may be a base station in an LTE system, and correspondingly, the terminal device 103 may be a terminal device in the LTE system; and the base station 102 of a cell may be a base station in the LTE system, or may be a wireless router, a wireless repeater, or a terminal device in a Wi-Fi system. No specific limitation is set herein.

The following describes the embodiments of the present disclosure in detail with reference to specific examples. It should be understood that these examples are merely intended to help persons skilled in the art better understand the embodiments of the present disclosure rather than limiting the scope of the embodiments of the present disclosure.

It should be further understood that, in the embodiment of the present disclosure, numbers "first" and "second" are merely intended to distinguish between different objects, for example, to distinguish between different sequences, and do not constitute any limitation on the scope of the embodiments of the present disclosure.

The following describes in detail a signal sending method according to an embodiment of the present disclosure with reference to accompanying drawings.

First, a frequency domain resource occupied by a first signal is described in detail.

In frequency domain, the first signal occupies N frequency domain units, each frequency domain unit of the N frequency domain units includes K contiguous sub carriers, and the first signal occupies L contiguous subcarriers in each frequency domain unit, where N is a positive integer greater than or equal to 2, K is a positive integer greater than or equal to 12, and L is a positive integer less than or equal to K.

It should be noted that the N frequency domain units occupy a same symbol in time domain.

Optionally, at least two frequency domain units of the N frequency domain units are discontinuous. Further optionally, frequency domain spacings between any two adjacent frequency domain units of the N frequency domain units are equal.

Optionally, one frequency domain unit may be considered as one RB, to be specific, a bandwidth of a frequency domain unit is 180000 Hz. That each frequency domain unit includes K contiguous subcarriers may be at least one of the following cases:

K=144, in other words, each frequency domain unit includes 144 contiguous subcarriers, where a bandwidth of each subcarrier is 1250 Hz;

K=72, in other words, each frequency domain unit includes 72 contiguous subcarriers, where a bandwidth of each subcarrier is 2500 Hz;

K=36, in other words, each frequency domain unit includes 36 contiguous subcarriers, where a bandwidth of each subcarrier is 5000 Hz;

K=24, in other words, each frequency domain unit includes 24 contiguous subcarriers, where a bandwidth of each subcarrier is 7500 Hz; and K=12, in other words, each frequency domain unit includes 12 contiguous subcarriers, where a bandwidth of each subcarrier is 15000 Hz.

Optionally, the first signal occupies K contiguous subcarriers in each frequency domain unit, to be specific, each subcarrier in each frequency domain unit carries the first signal.

Optionally, the first signal occupies L contiguous subcarriers in each frequency domain unit, where L is a positive integer less than K, to be specific, at least one subcarrier in each frequency domain unit does not carry the first signal. Further optionally, the first signal occupies L contiguous subcarriers located at a central location of each frequency domain unit, and at least one subcarrier of remaining subcarriers located on either side of two sides of the central location of each frequency domain unit does not carry a signal. Using this mapping manner can avoid interference between signals carried on two adjacent frequency domain units.

Figure 2A:
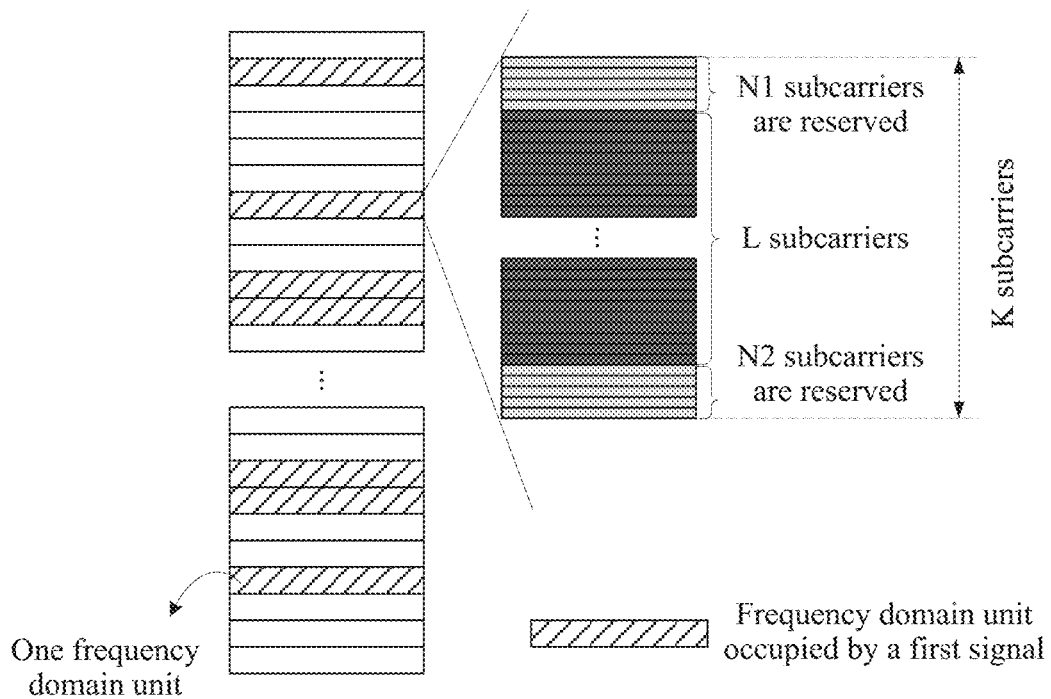
FIG. 2a shows a manner how a first signal occupies a frequency domain resource.

FIG. 2a shows a manner in which a first signal occupies a frequency domain resource. As shown in FIG. 2a, the first signal occupies N frequency domain units, at least two frequency domain units of the N frequency domain units are discontinuous, and each frequency domain unit of the N frequency domain units includes K contiguous subcarriers. The first signal occupies L contiguous subcarriers at a central location of each frequency domain unit. Of two sides of the central location of each frequency domain unit, N1 subcarriers are reserved on one side and signal mapping is not performed thereon; and N2 subcarriers are reserved on the other side and signal mapping is not performed thereon.

Figure 2B:
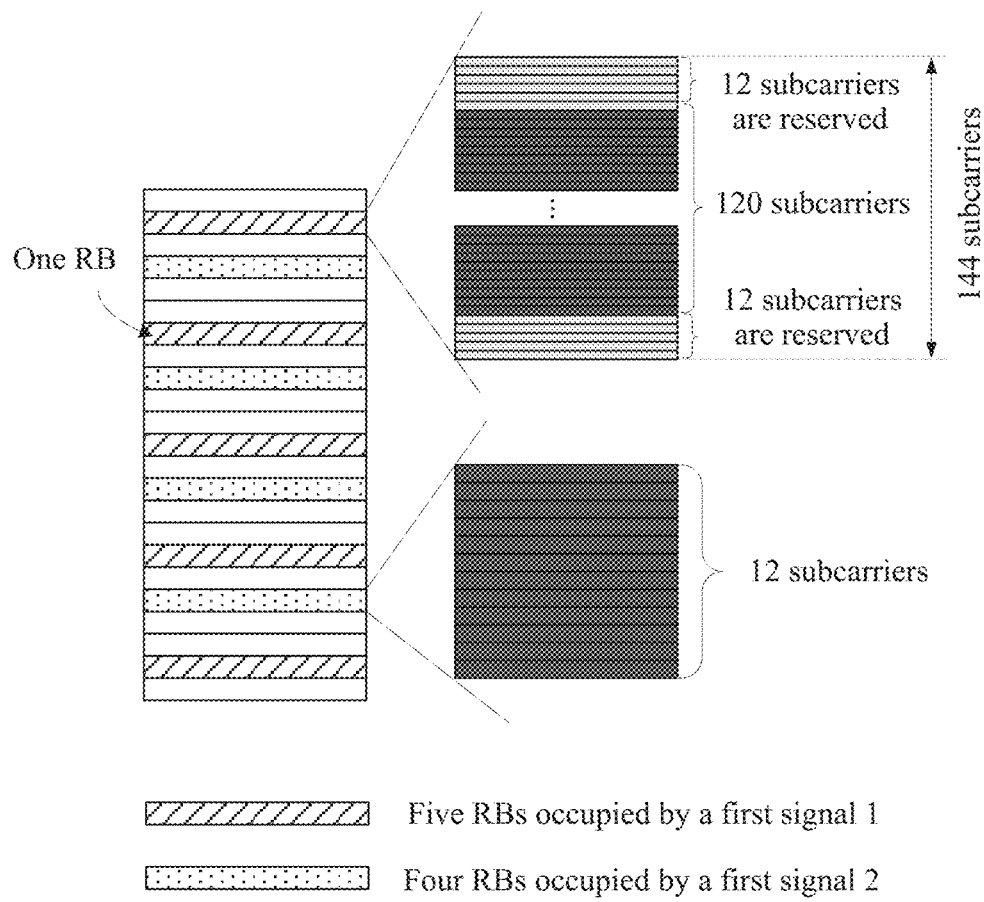
FIG. 2b shows another manner how a first signal occupies a frequency domain resource.

FIG. 2b shows another manner in which a first signal occupies a frequency domain resource. As shown in FIG. 2b, a first signal 1 and a first signal 2 occupy different frequency domain resources in a same time domain resource. The first signal 1 occupies five RBs, and frequency domain spacings between any two adjacent RBs of the five RBs are equal. Each RB of the five RBs includes 144 contiguous subcarriers, where a bandwidth of each subcarrier is 1250 Hz. The first signal 1 occupies 120 contiguous subcarriers at a central location in each RB, where 12 subcarriers are reserved on either side of two sides of the central location of each RB and signal mapping is not performed thereon (or in other words, no signal is carried thereon). The first signal 2 occupies four RBs, and frequency domain spacings between any two adjacent RBs of the four RBs are equal. Each RB of the four RBs includes 12 contiguous subcarriers, a bandwidth of each subcarrier is 15000 Hz, and the first signal 2 occupies all the 12 subcarriers in each RB.

The following describes in detail a time domain resource occupied by a first signal.

In time domain, the first signal occupies M symbols, where M is a positive integer greater than or equal to 1. When M is greater than 1, the M symbols are contiguous symbols.

Optionally, the M symbols are M symbols in an NCP subframe format.

Optionally, the M symbols are M symbols in an ECP subframe format.

Optionally, the M symbols may be in one format of the five formats, of a symbol occupied by a random access preamble sequence, shown in the foregoing Table 1, where M=1.

Optionally, the M symbols occupy one subframe, to be specific, 1 ms, in time domain.

Further optionally, the M symbols occupy all time domain resources in the 1 ms. For example, the M symbols are 14 contiguous symbols in one NCP subframe or 12 contiguous symbols in one ECP subframe.

Further optionally, the M symbols occupy some time domain resources in the 1 ms. For example, the M symbols are 13 contiguous symbols in one NCP subframe or 11 contiguous symbols in one ECP subframe. In this manner, one symbol that is not occupied may be used by a terminal device to perform channel resource contention using LBT.

Optionally, a length of a CP of at least the $1^{st}$ symbol of the M symbols is greater than 160·Ts, to be specific, the length of the CP of at least the $1^{st}$ symbol of the M symbols is greater than a length of a CP of any symbol in an NCP subframe format.

Figure 3A:
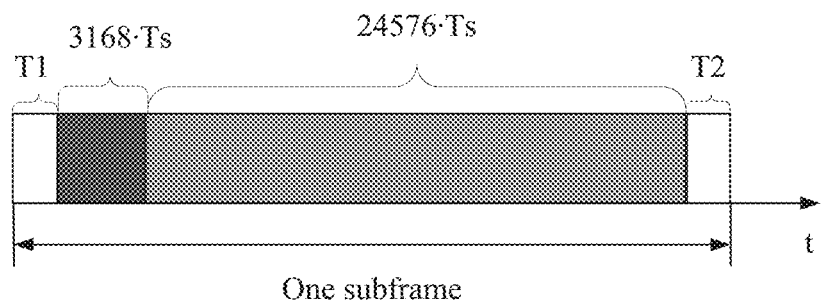
FIG. 3a shows a manner how a first signal occupies a time domain resource.

FIG. 3a shows a manner in which a first signal occupies a time domain resource. As shown in FIG. 3a, the first signal occupies one symbol, and the symbol is some resources in one subframe. For example, the symbol may be in a format of a symbol occupied by a random access preamble sequence format 0 shown in the foregoing Table 1, to be specific, a length of a CP of the symbol is 3168·Ts, and a length of an information segment is 24576·Ts.

It should be understood that, in a channel of an unlicensed spectrum, a specific time domain resource may need to be reserved for a terminal device to perform channel resource contention according to LBT.

Therefore, optionally, duration from a start moment of the symbol to a start moment of the subframe is T1, and duration from an end moment of the symbol to an end moment of the subframe is T2, where T1 or T2 is a number that is not equal to 0. Optionally, T1=0 and T2=2976·Ts, to be specific, the start moment of the symbol aligns with the start moment of the subframe. Optionally, T1=2976·Ts and T2=0, to be specific, the end moment of the symbol aligns with the end moment of the subframe. Optionally, T1=2208·Ts and T2=768·Ts, to be specific, the start moment of the symbol aligns with a start moment of a second symbol in an NCP subframe.

Figure 3B:
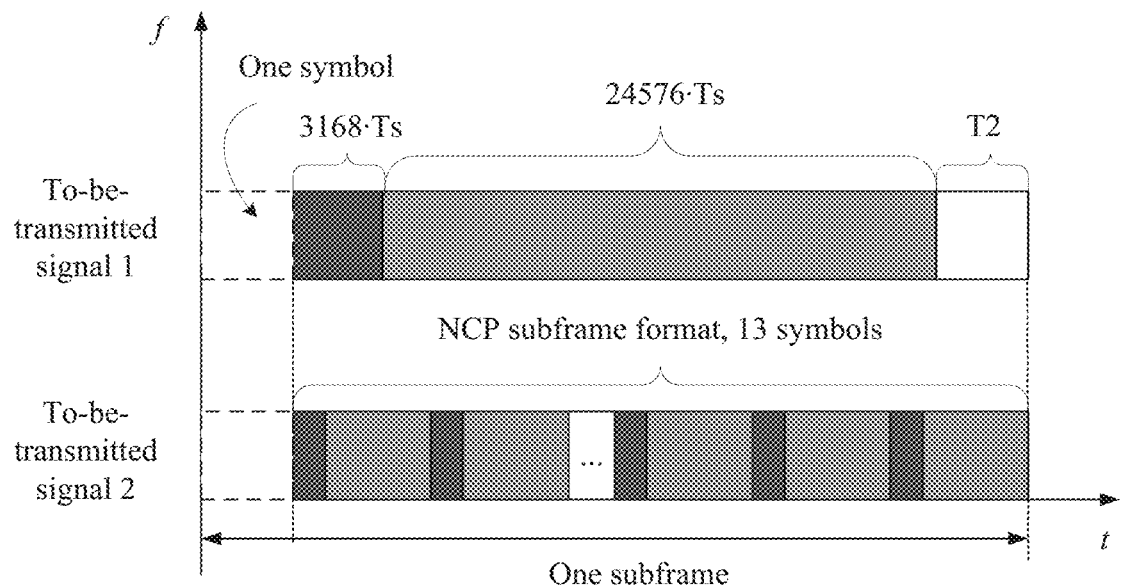
FIG. 3b shows another manner how a first signal occupies a time domain resource.

FIG. 3b shows another manner in which a first signal occupies a time domain resource. As shown in FIG. 3b, a first signal 1 and a first signal 2 occupy different frequency domain resources in a same time domain resource. The first signal 1 occupies one symbol, and the symbol is some resources in one subframe. For example, the symbol may be in a format of a symbol occupied by a random access preamble sequence format 0 shown in the foregoing Table 1, to be specific, a length of a CP of the symbol is 3168·Ts, and a length of an information segment is 24576·Ts. The first signal 2 occupies M contiguous symbols in one NCP subframe, where M is a natural number less than or equal to 14. Optionally, a symbol start moment of the first signal 1 aligns with a symbol start moment of a first symbol in the M contiguous symbols of the first signal 2. Further optionally, the symbol start moments of the first signal 1 and the first signal 2 align with a start moment of the subframe. Alternatively, the symbol start moments of the first signal 1 and the first signal 2 align with a start moment of a second symbol of the NCP subframe. For example, for the first signal 1, T1=2208·Ts and T2=768·Ts; and for the first signal 2, M is a natural number less than or equal to 13.

The following describes in detail content transmitted by a first signal according to an embodiment of the present disclosure.

Case 1

The first signal transmits a first sequence whose length is Z in each symbol of M symbols.

Specifically, the first signal includes M first sequences, a length of each first sequence of the M first sequences is Z and each first sequence is obtained based on at least one second sequence whose length is L, the second sequence is a sequence in an orthogonal sequence group, the orthogonal sequence group includes at least two second sequences whose lengths are L, and any two second sequences in the orthogonal sequence group are mutually orthogonal, where Z=N·L, M≥1, N≥2, and Z, M, N, and L are all natural numbers.

Optionally, in an embodiment, the M first sequences are the same. To be specific, the first signal is obtained by repeating the first sequence for M times.

Optionally, in an embodiment, at least two first sequences of the M first sequences are different.

Optionally, in an embodiment, each first sequence of the M first sequences is obtained based on one second sequence. For example, one first sequence is obtained by repeating one second sequence for N times.

It should be understood that the M first sequences may be obtained based on a same second sequence or may be obtained based on a plurality of second sequences. This is not limited in this embodiment of the present disclosure.

Optionally, in an embodiment, each first sequence of the M first sequences is obtained based on N second sequences. For example, one first sequence is obtained by combining the N second sequences.

In a specific implementation process, optionally, the at least two second sequences included in the orthogonal sequence group may be obtained by using the following manners.

Manner 1

The orthogonal sequence group is obtained using an orthogonal Walsh (Walsh) sequence whose length is L.

For example, the orthogonal Walsh sequence is:

$W = e^{j\alpha n}$, where $n = 0, 1, \ldots, L-1$, and $\alpha$ represents a cyclic shift, and $\alpha$ may be obtained by using the following formula:

$$\alpha = \frac{2\pi m}{L},$$

where $m = 0, 1, \ldots, L-1$, and m is any integer less than L. A cyclic shift value $\alpha$ varies according to a value of m, and each value of $\alpha$ corresponds to one orthogonal Walsh sequence, to be specific, each value of $\alpha$ may correspond to one second sequence.

Manner 2

The orthogonal sequence group is obtained using a Zadoff-Chu (Zadoff-Chu, ZC) sequence whose length is L.

Specifically, the orthogonal sequence group is obtained using different cyclic shifts of ZC sequences of a same base sequence, and each cyclic shift corresponds to one second sequence. For a manner of generating the ZC sequence, refer to descriptions below.

Manner 3

The orthogonal sequence group is obtained using an orthogonal cover code OCC sequence whose length is $L_1$, where $L_1$ is an even number less than or equal to L.

For example, $L_1$ is an even number less than L. For example, L=4, and $L_1$=2. An OCC sequence #1 and an OCC sequence #2 whose lengths are 2 and that are mutually orthogonal are selected as base sequences. The OCC sequence #1 is [1 1] and the OCC sequence #2 is [−1 1]. A sequence #3 [1 1 1 1] is obtained by repeating the OCC sequence #1 twice; and a sequence #4 [−1 1 −1 1] is obtained by repeating the OCC sequence #2 twice. The sequence #3 and the sequence #4 are second sequences in the orthogonal sequence group. For another example, a sequence #5 [1 1 1 −1] is obtained by repeating the OCC sequence #1 twice, one in a positive manner and one in a reverse manner; and a sequence #6 [−1 1 1 −1] is obtained by repeating the OCC sequence #2 twice, one in a positive manner and one in a reverse manner. The sequence #5 and the sequence #6 are second sequences in the orthogonal sequence group.

For another example, $L_1$ is an even number equal to L. For example, L=4, and $L_1$=4. OCC sequences #1, #2, #3, and #4 whose lengths are 4 and that are mutually orthogonal are selected, where the OCC sequence #1 is [1 1 1 1], the OCC sequence #2 is [1 −1 1 −1], the OCC sequence #3 is [1 1 −1 −1], and the OCC sequence #4 is [1 −1 −1 1]. The base sequences #1, #2, #3, and #4 are second sequences in the orthogonal sequence group.

It should be noted that the mutually orthogonal OCC sequences selected above are examples rather than limitations.

Optionally, in an embodiment, each first sequence of the M first sequences is obtained based on a third sequence whose length is Z and one second sequence.

For example, one-to-one point multiplication is performed on an element in a sequence whose length is Z and that is obtained by repeating one second sequence for N times and an element in the third sequence, to obtain one first sequence.

For example, a sequence (which is denoted as a sequence #A for distinction in description) whose length is Z is obtained by repeating one second sequence for N times, and then one-to-one point multiplication is performed on an element in the sequence #A and the element in the third sequence, to obtain one first sequence.

Optionally, in an embodiment, each first sequence of the M first sequences is obtained based on a third sequence whose length is Z and at least one second sequence.

For example, the at least one second sequence is N second sequences. One-to-one point multiplication is performed on an element in a sequence whose length is Z and that is obtained by combining the N second sequences and an element in the third sequence, to obtain each first sequence.

In a specific implementation process, optionally, the third sequence includes a Constant Amplitude Zero Auto Correlation (Constant Amplitude Zero Auto Correlation, CAZAC) sequence that has a good auto-correlation feature and/or cross-correlation feature in time domain or frequency domain. Optionally, the third sequence may include a Zadoff-Chu (Zadoff-Chu, ZC) sequence. Particularly, the third sequence may include a centrosymmetric ZC sequence.

The following describes in detail the ZC sequence or the centrosymmetric ZC sequence. A base sequence expression of the ZC sequence may be:

$$a_{r,S}(n) = \begin{cases} \exp\left[-\frac{j2\pi \cdot r}{S}\left(q \cdot n + \frac{n \cdot (n+1)}{2}\right)\right] & \text{S is an odd number,} \\ & \text{and } n = 0, 1, \ldots, S-1 \\ \exp\left[-\frac{j2\pi \cdot r}{S}\left(q \cdot n + \frac{n^2}{2}\right)\right] & \text{S is an even number,} \\ & \text{and } n = 0, 1, \ldots, S-1 \end{cases},$$

where

S is a positive integer and represents a length of the ZC sequence, r is an integer coprime with S, each value of r corresponds to one base sequence, a value of q is an integer and may be set to 0, and $a_{r,S}(n)$ represents an $n^{th}$ element in the ZC sequence when r and S are given.

A base sequence expression of the centrosymmetric ZC sequence may be:

$$a_{r,S}(n) = \begin{cases} \exp\left[-\dfrac{j\pi \cdot r \cdot n \cdot (n+1)}{S+1}\right], & 0 \le n \le S/2 - 1 \\ \exp\left[-\dfrac{j\pi \cdot r \cdot (n+1) \cdot (n+2)}{S+1}\right], & S/2 \le n \le S - 1 \end{cases},$$

where

S is an even number and represents a length of the ZC sequence, r is an integer coprime with S+1, each value of r corresponds to one base sequence, and $a_{r,S}(n)$ represents an $n^{th}$ element in the ZC sequence when r and S are given.

The ZC sequence has the following properties:

(1) Cyclic shift sequences of a base sequence are orthogonal;

(2) When S is a prime number, a cross-correlation value between any two sequences is extremely low; and (3) Minor truncation and cyclic extension have slight impact on a sequence property.

It can be learned that when a length S of a ZC sequence is given, a quantity of available base sequences is a quantity of possible values of r in the foregoing expression. Therefore, under a same length of the ZC sequence, a plurality of sequences with an extremely low cross-correlation value may be obtained by using different values of r or different quantities of cyclic shift bits.

Optionally, the third sequence whose length is Z is obtained by using a ZC sequence whose length is Z, to be specific, S=Z.

Optionally, the third sequence whose length is Z is obtained by performing cyclic extension on a ZC sequence whose length is $Z_1$, to be specific, $S=Z_1$, where $Z_1$ is a maximum prime number less than Z.

Optionally, the third sequence whose length is Z is obtained by truncating a ZC sequence whose length is $Z_2$, to be specific, $S=Z_2$, where $Z_2$ is a minimum prime number greater than Z.

Optionally, the third sequence is a pseudo random sequence.

For example, the third sequence whose length is Z is obtained using the following formula:

$$r(z) = \frac{1}{\sqrt{2}}(1 - 2 \cdot c(2z)) + j\frac{1}{\sqrt{2}}(1 - 2 \cdot c(2z+1)),$$

where $z = 0, 1, \ldots, Z-1$, and c(x) represents a formula for generating a pseudo random sequence.

Case 2

The first signal transmits a first sequence whose length is Z in each symbol of the M symbols and transmits data information in S symbols of the M symbols, where S<M, and M>1.

It should be understood that the first sequence herein may be obtained in the various manners of generating the first sequence that are described in the foregoing case 1, and details are not described herein again.

Optionally, in an embodiment, the data information is uplink control information, and the uplink control information includes at least one type of hybrid automatic repeat request (Hybrid Automatic Repeat Request, HARQ) information, channel state information, and scheduling request information.

Optionally, in an embodiment, the data information is HARQ information. N frequency domain units include a first frequency domain unit and a second frequency domain unit, the first frequency domain unit and the second frequency domain unit respectively carry first HARQ information and second HARQ information, and the first HARQ information and the second HARQ information correspond to different carriers or subframes. The first HARQ information or the second HARQ information is a before-coding original HARQ information bit.

Optionally, point multiplication is performed on an element in the first sequence transmitted in each symbol of the S symbols and the data information, to obtain information transmitted in each symbol of the S symbols.

The first signal occupies N frequency domain units and occupies L subcarriers in each frequency domain unit. Therefore, optionally, each symbol of the S symbols carries same before-coding original uplink control information, each frequency domain unit of the N frequency domain units carries same before-coding original uplink control information, and L subcarriers in each frequency domain unit also carry same before-coding original uplink control information.

Optionally, each symbol of the S symbols carries same before-coding original uplink control information, at least two frequency domain units of the N frequency domain units carry different before-coding original uplink control information, and all subcarriers included in each frequency domain unit carry same before-coding original uplink control information.

Optionally, each symbol of the S symbols carries same before-coding original uplink control information, each RB of N RBs carries same before-coding original uplink control information, and at least two subcarriers of 12 subcarriers in each RB carry different before-coding original uplink control information.

Optionally, at least two symbols of the S symbols carry different before-coding original uplink control information, each RB of N RBs carries same before-coding original uplink control information, and 12 subcarriers in each RB also carry same before-coding original uplink control information, where S>2.

Optionally, at least two symbols of the S symbols carry different before-coding original uplink control information, at least two RBs of N RBs carry different before-coding original uplink control information, and 12 subcarriers in each RB carry same before-coding original uplink control information, where S>2.

Optionally, a size of the frequency domain unit is one RB, and one RB includes 12 subcarriers.

Optionally, in an embodiment, the data information is uplink control information, and the uplink control information is hybrid automatic repeat request information. At least two frequency domain units of N frequency domain units carry different hybrid automatic repeat request information, and the at least two pieces of hybrid automatic repeat request information correspond to at least two different carriers or subframes.

It should be noted that any manner of the manners in which the first signal occupies a frequency domain resource, any manner of the manners in which the first signal occupies a time domain resource, and any manner of the manners of determining content transmitted by the first signal in each symbol may be combined with each other. The following provides detailed descriptions with reference to specific examples.

Figure 4A:
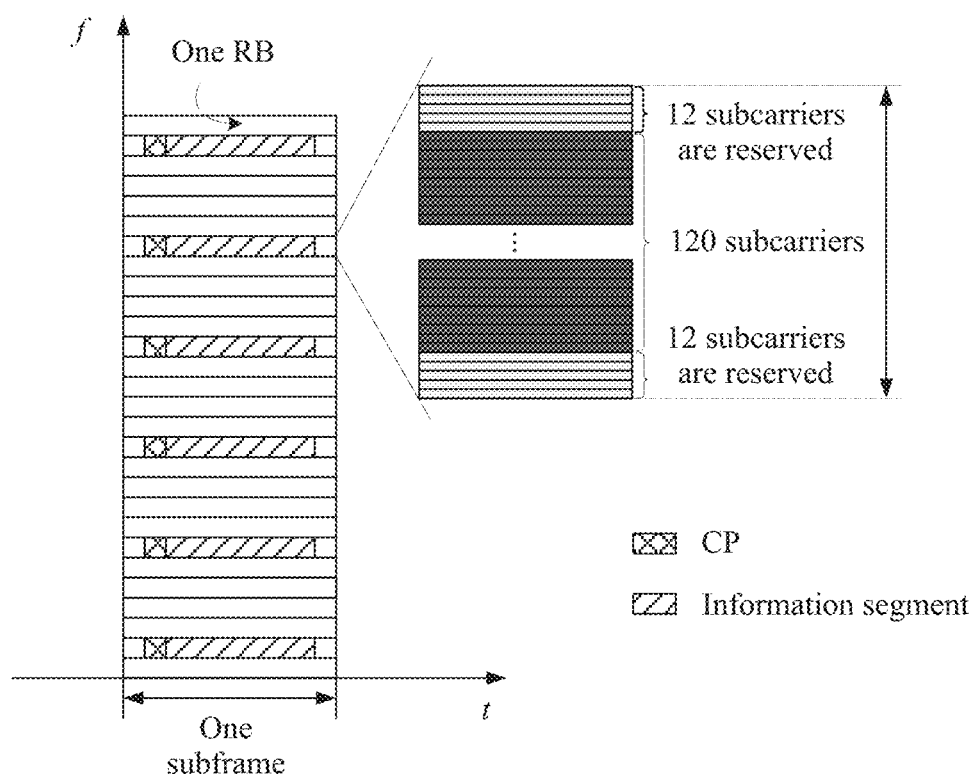
FIG. 4a shows a signal sending method according to an embodiment of the present disclosure.

FIG. 4a shows a signal sending method according to an embodiment of the present disclosure. As shown in FIG. 4a, in frequency domain, a first signal occupies six RBs, and frequency domain spacings between any two adjacent RBs of the six RBs are equal. Each RB of the six RBs includes 144 contiguous subcarriers, where a bandwidth of each subcarrier is 1250 Hz. The first signal occupies 120 contiguous subcarriers at a central location in each RB, where 12 subcarriers are reserved on either side of two sides of the central location of each RB and signal mapping is not performed thereon.

In time domain, the first signal occupies one symbol (which is denoted as a symbol #a for ease of description and understanding). The symbol #a is in a format of a symbol occupied by a random access preamble sequence format 0 shown in the foregoing Table 1, to be specific, a length of a CP of the symbol #a is 3168·Ts, and a length of an information segment is 24576·Ts. A start moment of the symbol #a aligns with a start moment of a second symbol of an NCP subframe, to be specific, duration between the start moment of the symbol #a and a start moment of the NCP subframe is 2208·Ts.

Content that needs to be transmitted by the first signal in the symbol #a is a first sequence. The first sequence may be used in random access of a terminal device. A length of the first sequence is Z and the first sequence may be obtained by using a third sequence whose length is Z and a second sequence whose length is L. The third sequence may be obtained by performing cyclic extension on a ZC sequence whose length is $Z_1$, and the second sequence is any sequence in an orthogonal sequence group that includes at least two mutually orthogonal Walsh sequences whose lengths are L. Specifically, the first sequence is generated in the following process:

$R_1(n)=R_2(n) \cdot R_3(n)$, $0 \le n < Z$, $R_2(n)=e^{j\alpha n}$, where $0 \le n < Z$, $$\alpha = \frac{2\pi v}{L},$$

and $0 \le v < L$, and $R_3(n)=a_u(n \bmod Z_1)$, where $0 \le n < Z$, $$a_u(m) = \exp\left[-\frac{j\pi u m(m+1)}{Z_1}\right],$$

and $0 \le m \le Z_1-1$, where each value of u corresponds to one base sequence, and u is an integer coprime with $Z_1$; and $R_1(n)$ represents the first sequence whose length is Z, $R_2(n)$ represents a sequence whose length is Z and that is obtained by repeating the second sequence whose length is L for N times, and $R_3(n)$ represents the third sequence whose length is Z, which is obtained by performing cyclic extension on the ZC sequence whose length is $Z_1$. It should be noted that different values of v correspond to different cyclic shifts, to be specific, correspond to different second sequences. Because $Z=N \cdot L$, it is equivalent that a sequence generated by the foregoing $R_2(n)$ is obtained by repeating the second sequence whose length is L and that corresponds to the value of v for N times. Optionally, the value of u may be obtained through calculation based on a cell identity or obtained based on signaling notified by a base station. Optionally, a difference between any two values of v is greater than a cyclic shift interval. The cyclic shift interval may be predefined or may be obtained based on signaling notified by a base station.

Using FIG. 4a as an example, Z=720, L=120, $Z_1$=719, the value of u is an integer greater than or equal to 0 and is less than or equal to 717, and the value of v is an integer greater than or equal to 0 and less than 120. Assuming that the cyclic shift interval is 10, available values of v in a system include 0, 10, 20, 30, 40, 50, 60, 70, 80, 90, 100, and 110. To be specific, there are 12 first sequences. If one base sequence and a quantity of first sequences obtained using the 12 cyclic shifts cannot meet a cell requirement, there may further be a plurality of base sequences. For example, when two base sequences are used, there are 24 available sequences; when three base sequences are used, there are 36 available sequences; by analogy, a quantity of sequences that meet the cell requirement can be obtained.

It should be understood that in the foregoing process of generating the first sequence, an order of generating the sequences should not be construed as any limitation on the protection scope of the embodiments of the present disclosure. The order of generating the sequences should be determined based on internal logic thereof. To be specific, a manner in which the first sequence is finally generated regardless of an order in which the foregoing plurality of sequences are generated should fall within the protection scope of the embodiments of the present disclosure.

When there are a plurality of users in a system, optionally, each user selects one first sequence, and the plurality of users may send their respective first sequences on a same time-frequency resource.

In the signal sending method shown in FIG. 4a, first sequences sent by different users in a frequency domain unit are orthogonal in a segmented manner by using an orthogonal sequence code. Therefore, when the first sequences are mapped to discrete RBs, orthogonality of a plurality of first sequences can still be ensured after the plurality of first sequences undergo channel fading. In addition, a length of a CP of a symbol corresponding to the first sequence is 3168·Ts, which is far greater than 10 μs and is sufficient to support a coverage area of a cell in an unlicensed spectrum.

Figure 4B:
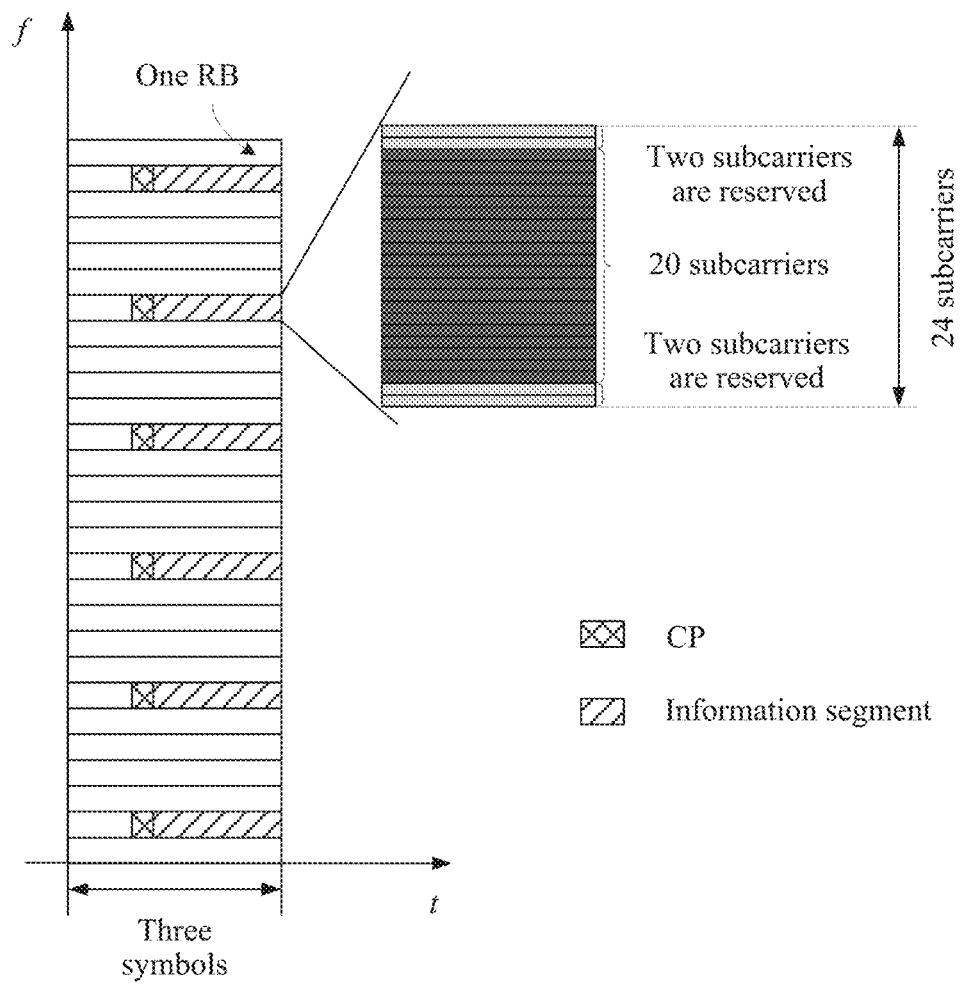
FIG. 4b shows a signal sending method according to another embodiment of the present disclosure.

FIG. 4b shows a signal sending method according to another embodiment of the present disclosure. As shown in FIG. 4b, in frequency domain, a first signal occupies six RBs, and frequency domain spacings between any two adjacent RBs of the six RBs are equal. Each RB of the six RBs includes 24 contiguous subcarriers, where a bandwidth of each subcarrier is 7500 Hz. The first signal occupies 20 contiguous subcarriers at a central location in each RB, where two subcarriers are reserved on either side of two sides of the central location of each RB and signal mapping is not performed thereon.

In time domain, the first signal occupies at least one symbol. In the figure, one symbol is used as an example. The symbol may be in a format of a symbol occupied by a random access preamble sequence format 4 shown in the foregoing Table 1, to be specific, a length of a CP of the symbol is 448·Ts, and a length of an information segment is 4096·Ts. Optionally, duration between a start moment of the symbol and a start moment of an NCP subframe is 2208·Ts. Optionally, a start moment of the symbol aligns with a start moment of a symbol of an NCP or ECP subframe. Optionally, an end moment of the symbol aligns with an end moment of a symbol of an NCP or ECP subframe, as shown in the figure.

Content that needs to be transmitted by the first signal in the symbol is a first sequence. The first sequence may be used in random access of a terminal device. A manner of generating the first sequence may be similar to a generating manner in the example described in FIG. 4a, where Z=120, L=20, and $Z_1$=113. Details are not described herein again.

Similarly, when there are a plurality of users in a system, optionally, each user selects one first sequence, and the plurality of users may send the first sequences on a same time-frequency resource.

In the signal sending method shown in FIG. 4b, first sequences sent by different users in a frequency domain unit are orthogonal in a segmented manner by using an orthogonal sequence code. Therefore, when the first sequences are mapped to discrete RBs, orthogonality of a plurality of first sequences can still be ensured after the plurality of first sequences undergo channel fading. In addition, a length of a CP of a symbol corresponding to the first sequence is 448·Ts, which is also greater than 10 μs and can support a coverage area of a cell in an unlicensed spectrum.

A length of a CP corresponding to each symbol in an ECP subframe format is 512·Ts, which is greater than 10 μs and can support the coverage area of the cell in the unlicensed spectrum. Therefore, when a first signal is a random access preamble sequence, a subframe in which the random access preamble sequence is located may be an ECP subframe.

Figure 4C:
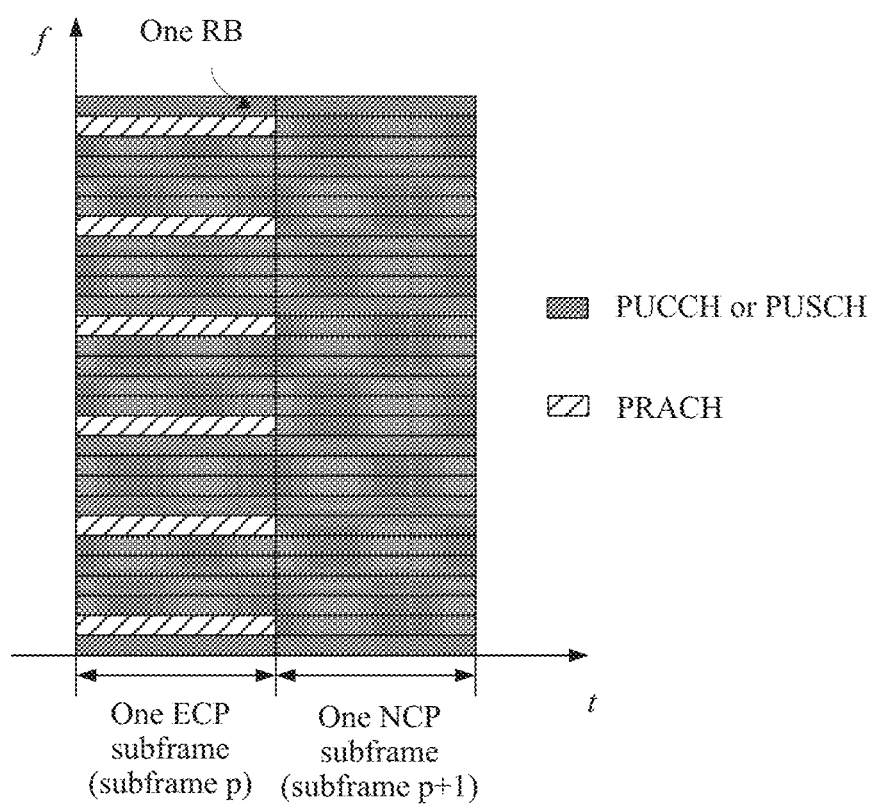
FIG. 4c shows a signal sending method according to still another embodiment of the present disclosure.

FIG. 4c shows a signal sending method according to still another embodiment of the present disclosure. As shown in FIG. 4c, a first signal is a random access preamble sequence, a subframe p in which the first signal is located is an ECP subframe, and the first signal occupies M contiguous symbols in the subframe. A subframe p+1 is a subframe that does not carry the first signal. Therefore, the subframe p+1 is an NCP subframe. Optionally, a base station notifies, by using physical layer signaling, whether an uplink subframe is in an NCP subframe format or an ECP subframe format. A PUSCH that is multiplexed with a PRACH in a same subframe uses an ECP subframe format. Optionally, one symbol is reserved in the subframe and is used by a device to perform channel contention using LBT. A first sequence may be an SRS sequence or a DMRS sequence.

Figure 4D:
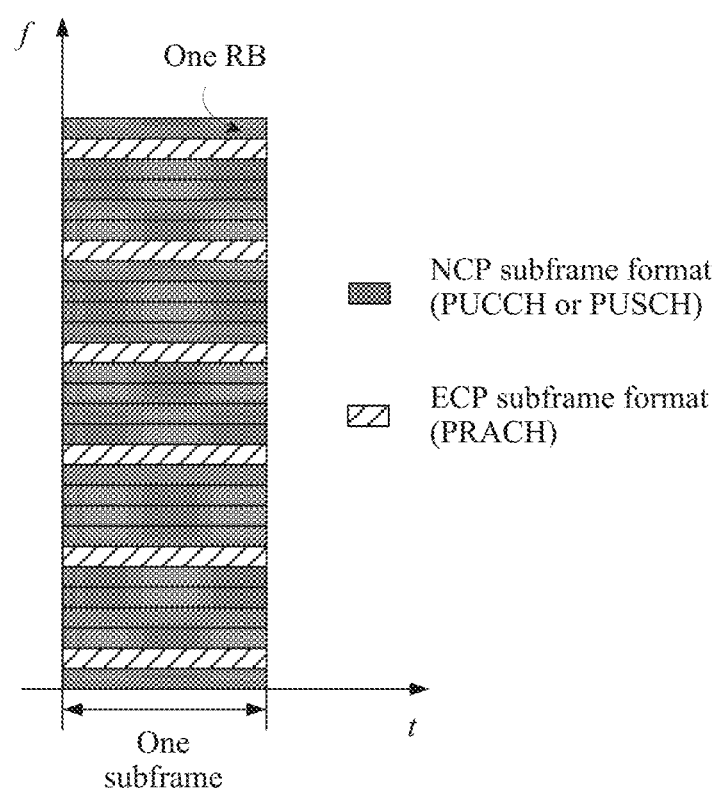
FIG. 4d shows a signal sending method according to yet another embodiment of the present disclosure.

FIG. 4d shows a signal sending method according to yet another embodiment of the present disclosure. A PRACH uses an ECP subframe format, and another uplink physical channel uses an NCP subframe format. As shown in FIG. 4d, to avoid interference between the PRACH channel and a PUSCH or PUCCH channel, a first signal occupies 10 contiguous subcarriers located at a central location of each RB, and at least one subcarrier located on either side of two sides of the central location of each RB does not carry a signal.

Figure 4E:
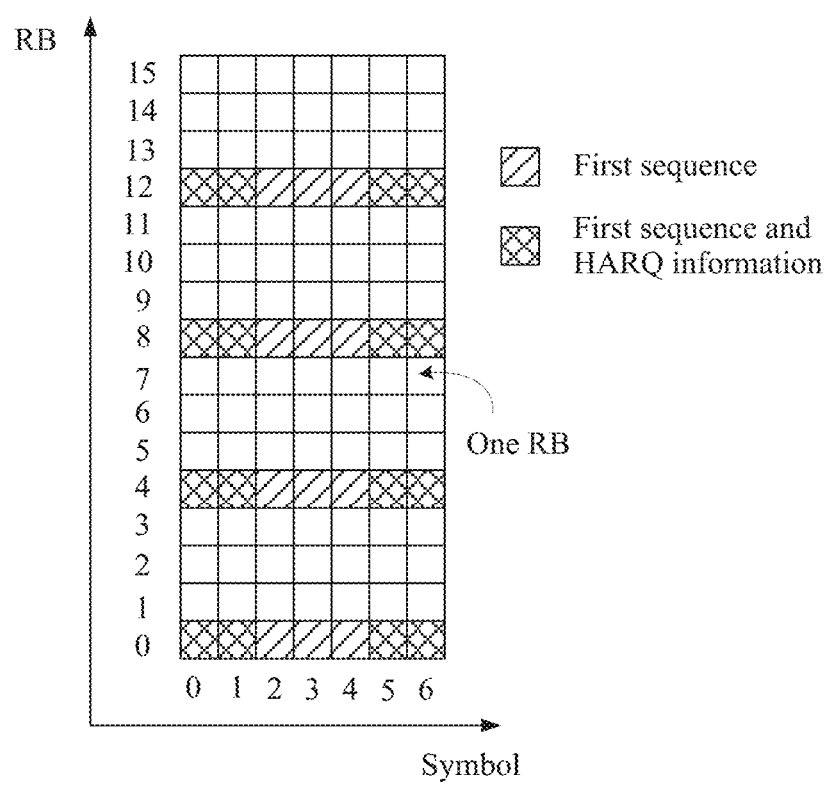
FIG. 4e shows a signal sending method according to yet another embodiment of the present disclosure.

FIG. 4e shows a signal sending method according to yet another embodiment of the present disclosure. A first signal transmits a first sequence whose length is Z in each symbol of M symbols and further transmits data information in S symbols of the M symbols, where M>S, and M>1. As shown in FIG. 4e, a PUCCH occupies one timeslot, and the first signal occupies all symbols included in the timeslot. To be specific, the first signal occupies seven symbols, and sequences (which may correspond to the first sequences in FIG. 4e) transmitted in the symbols are the same. HARQ information is further transmitted in four symbols (which may correspond to a symbol 0, a symbol 1, a symbol 5, and a symbol 6 in FIG. 4e) of the seven symbols.

Figure 4F:
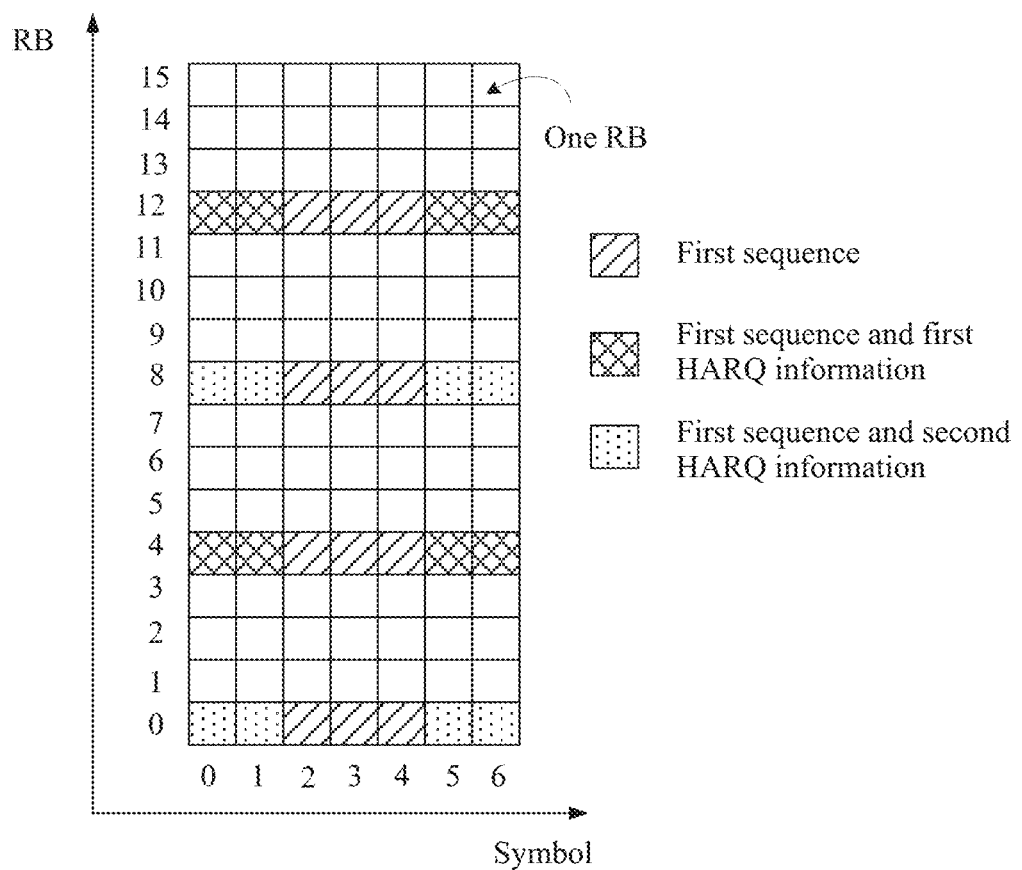
FIG. 4f shows a signal sending method according to yet another embodiment of the present disclosure.

FIG. 4f shows a signal sending method according to yet another embodiment of the present disclosure. A first signal transmits a first sequence whose length is Z in each symbol of M symbols and further transmits data information in S symbols of the M symbols, where M>S, and M>1. As shown in FIG. 4f, a PUCCH occupies one timeslot, and the first signal occupies all symbols included in the timeslot. To be specific, the first signal occupies seven symbols. HARQ information is further transmitted in four symbols (which may correspond to a symbol 0, a symbol 1, a symbol 5, and a symbol 6 in FIG. 4f) of the seven symbols. An RB #0 and an RB #8 transmit same information, to be specific, a first sequence and second HARQ information. An RB #4 and an RB #12 transmit same information, to be specific, the first sequence and a first HARQ information.

It should be noted that the information transmitted in the RBs shown in FIG. 4f is merely used as an example. For example, alternatively, the RB #0, the RB #4, and the RB #8 transmit the first sequence and the first HARQ information, and the RB #12 transmits the first sequence and the second HARQ information.

In the transmission manner shown in FIG. 4f, when providing, to a base station, feedback about whether information is successfully received, UE first feeds back HARQ information of different carriers of a same subframe and starts feeding back different carriers of another subframe after feedback of one subframe is completed. In other words, the UE performs feedback by subframe and starts feeding back a next subframe only after feedback of all carriers in a subframe is completed.

For example, the UE needs to feed back carriers of two subframes (which are denoted as a subframe n and a subframe n+1 for ease of description). Assuming that RBs used in feedback are respectively an RB #0, an RB #1, an RB #2, and an RB #3, the UE feeds back a carrier #0 of the subframe n in the RB #0 and feeds back a carrier #1 of the subframe n in the RB #1, and feeds back a carrier #0 of the subframe n+1 in the RB #2 and feeds back a carrier #1 of the subframe n+1 in the RB #3.

Figure 5:
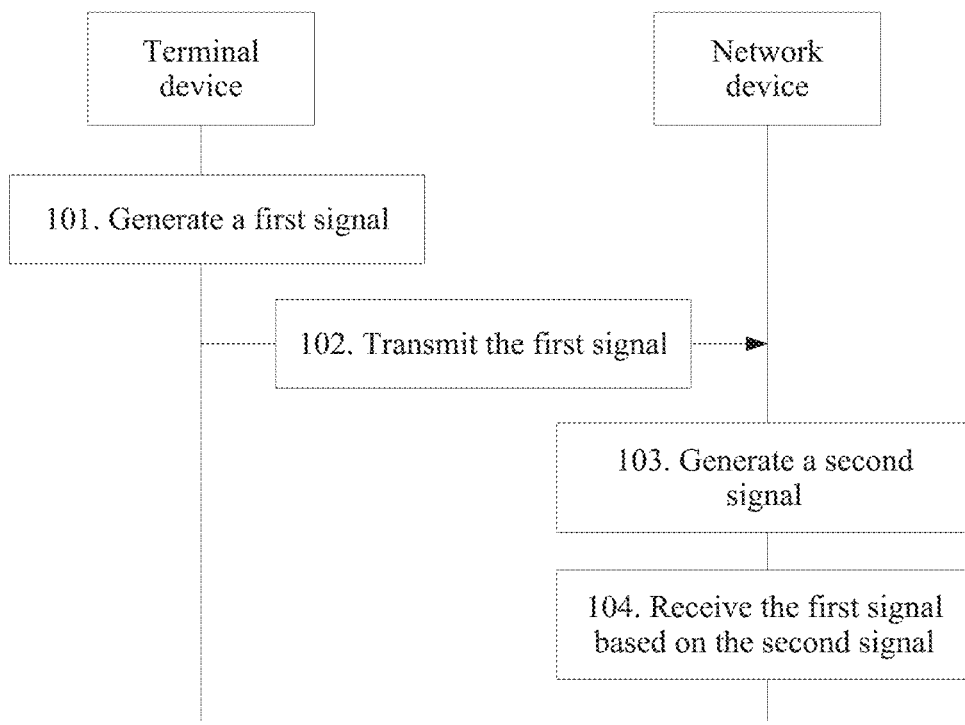
FIG. 5 shows a schematic flowchart of a signal sending method 100 according to an embodiment of the present disclosure from the perspective of device interaction.

The following illustrates a signal sending method according to an embodiment of the present disclosure by using uplink transmission (to be specific, a sending device is a terminal device and a receiving device is a network device) as an example with reference to FIG. 5.

FIG. 5 shows a schematic flowchart of a signal sending method 100 according to an embodiment of the present disclosure from the perspective of device interaction. The method 100 includes a network device and a terminal device. As shown in FIG. 5, the method 100 includes the following steps.

101. The terminal device generates a first signal.

The first signal includes M first sequences, a length of each first sequence of the M first sequences is Z and each first sequence is obtained based on at least one second sequence whose length is L, the second sequence is a sequence in an orthogonal sequence group, the orthogonal sequence group includes at least two second sequences whose lengths are L, and all second sequences in the orthogonal sequence group are mutually orthogonal, where Z=N·L, M≥1, N≥2, and Z, M, N, and L are all natural numbers.

Optionally, any two first sequences of the M first sequences are the same. To be specific, the M first sequences are duplicates.

Optionally, at least two first sequences of the M first sequences are different.

Optionally, each first sequence of the M first sequences is obtained based on one second sequence. For example, one first sequence is obtained by repeating one second sequence for N times.

Optionally, each first sequence of the M first sequences is obtained based on N second sequences. For example, one first sequence is obtained by combining the N second sequences.

Optionally, the orthogonal sequence group is obtained using an orthogonal Walsh sequence whose length is L.

Optionally, the orthogonal sequence group is obtained by using different cyclic shifts of ZC sequences of a same base sequence whose length is L.

Optionally, the orthogonal sequence group is obtained using an orthogonal cover code OCC sequence whose length is $L_1$, where $L_1$ is an even number less than or equal to L.

Optionally, each first sequence of the M first sequences is obtained based on a third sequence whose length is Z and one second sequence. For example, one-to-one point multiplication is performed on an element in the third sequence and an element in a sequence whose length is Z and that is obtained by repeating the second sequence for N times, to obtain one first sequence.

Optionally, each first sequence of the M first sequences is obtained based on a third sequence whose length is Z and at least one second sequence. For example, each first sequence of the M first sequences is obtained based on the third sequence whose length is Z and N second sequences. Specifically, one-to-one point multiplication is performed on an element in the third sequence and an element in a sequence whose length is Z and that is obtained by combining the N second sequences, to obtain one first sequence.

Optionally, the third sequence is a CAZAC sequence or a ZC sequence or a centrosymmetric ZC sequence whose length is Z.

Optionally, the third sequence is obtained by using a ZC sequence whose length is Z.

Optionally, the third sequence is obtained by performing cyclic extension on a ZC sequence whose length is $Z_1$, where $Z_1$ is a maximum prime number less than Z.

Optionally, the third sequence is obtained by truncating a ZC sequence whose length is $Z_2$, where $Z_2$ is a minimum prime number greater than Z.

Optionally, the third sequence is a pseudo random sequence.

102. The terminal device sends the first signal.

The first signal occupies M symbols in time domain, the first signal occupies N frequency domain units in frequency domain, each frequency domain unit of the N frequency domain units includes K contiguous subcarriers, and the first signal occupies L contiguous subcarriers in each frequency domain unit. The M sequences are in a one-to-one correspondence to the M symbols. $K \geq 12$, $1 \leq L \leq K$, and K is a natural number. When $M > 1$, the M symbols are contiguous symbols.

Optionally, at least two frequency domain units of the N frequency domain units are discontinuous. Further optionally, frequency domain spacings between any two adjacent frequency domain units of the N frequency domain units are equal.

Optionally, one frequency domain unit may be considered as one RB, to be specific, a bandwidth of a frequency domain unit is 180000 Hz.

Optionally, K=144, in other words, each frequency domain unit includes 144 contiguous subcarriers, where a bandwidth of each subcarrier is 1250 Hz.

Optionally, K=72, in other words, each frequency domain unit includes 72 contiguous subcarriers, where a bandwidth of each subcarrier is 2500 Hz.

Optionally, K=36, in other words, each frequency domain unit includes 36 contiguous subcarriers, where a bandwidth of each subcarrier is 5000 Hz.

Optionally, K=24, in other words, each frequency domain unit includes 24 contiguous subcarriers, where a bandwidth of each subcarrier is 7500 Hz.

Optionally, K=12, in other words, each frequency domain unit includes 12 contiguous subcarriers, where a bandwidth of each subcarrier is 15000 Hz.

Optionally, the first signal occupies K contiguous subcarriers in each frequency domain unit, to be specific, each subcarrier in each frequency domain unit carries the first signal.

Optionally, the first signal occupies L contiguous subcarriers in each frequency domain unit, where L is a positive integer less than K, to be specific, at least one subcarrier in each frequency domain unit does not carry the first signal.

Further optionally, the first signal occupies L contiguous subcarriers located at a central location of each frequency domain unit, and at least one remaining subcarrier located on either side of two sides of the central location of each frequency domain unit does not carry a signal. Using this mapping manner can avoid interference between signals on two adjacent frequency domain units.

Optionally, the M symbols may be M symbols in an NCP subframe format.

Optionally, the M symbols may be M symbols in an ECP subframe format.

Optionally, the M symbols may be in one format of the five formats, of a symbol occupied by a random access preamble sequence, shown in the foregoing Table 1, where M=1.

Optionally, the M symbols occupy all resources of one subframe in time domain.

Optionally, the M symbols occupy some resources of one subframe in time domain.

Optionally, a length of a CP of at least the $1^{st}$ symbol of the M symbols is greater than 160·Ts.

Optionally, the first signal is a random access preamble sequence. A PRACH corresponding to the random access preamble sequence occupies N RBs in frequency domain and occupies M symbols in time domain. A length of a CP of at least the $1^{st}$ symbol of the M symbols is greater than 160·Ts, where Ts=1/(15000×2048) seconds.

The following describes several possible manners of the signal sending method according to this embodiment of the present disclosure when the first signal is a random access preamble sequence.

It should be noted that the signal sending method according to this embodiment of the present disclosure is also applicable when the first signal is an SRS or a DMRS.

Optionally, one frequency domain unit is one RB. The following describes a mapping manner (or in other words, a distribution manner) of the random access preamble sequence in frequency domain by using an example in which one frequency domain unit is one RB.

In a possible manner, a PRACH includes one symbol. The symbol may be in a format of a symbol occupied by a random access preamble sequence format 0 shown in the foregoing Table 1. To be specific, a length of a CP of the symbol is 3168·Ts, a length of an information segment is 24576·Ts, and the symbol occupies one subframe in time domain. Correspondingly, in frequency domain, each RB of N RBs includes 144 contiguous subcarriers, where a bandwidth of each subcarrier is 1250 Hz (refer to FIG. 4a).

Optionally, the random access preamble sequence is mapped to L contiguous subcarriers located at a central location of each RB. Of two sides of the central location of each RB, N1 subcarriers are reserved on one side and signal mapping is not performed thereon (or in other words, no signal is carried thereon); and N2 subcarriers are reserved on the other side and signal mapping is not performed thereon. Optionally, the random access preamble sequence is mapped to 120 contiguous subcarriers located at the central location of each RB, and 12 subcarriers are reserved on either side of two sides of the central location of each RB and signal mapping is not performed thereon.

Optionally, a start moment of the symbol corresponding to the PRACH aligns with a start moment of a subframe. Considering that the terminal device first needs to detect whether a channel is idle when using a resource in an unlicensed spectrum, the $1^{st}$ symbol in a subframe may be used by the terminal device to perform LBT detection. Optionally, the start moment of the symbol corresponding to the PRACH aligns with a start moment of a second symbol of a subframe.

Optionally, the random access preamble sequence is obtained based on a third sequence whose length is Z and one second sequence.

Specifically, one-to-one point multiplication is performed on an element in the third sequence whose length is Z and an element in a sequence obtained by repeating the second sequence for N times, to obtain one random access preamble sequence. The second sequence is obtained by using an orthogonal Walsh sequence with different cyclic shifts. A quantity of cyclic shifts is determined based on a length of the second sequence and a cyclic shift interval. The third sequence is a ZC sequence, and each base sequence can be used to obtain one third sequence. Assuming that a quantity of second sequences is P, P random access preamble sequences may be obtained based on the P second sequences and a third sequence obtained based on one base sequence. If a quantity of random access preamble sequences required in a cell is greater than P, new P random access preamble sequences may be obtained based on the P second sequences and a third sequence obtained based on another base sequence, until a quantity of generated random access preamble sequences meets the requirement.

Optionally, the network device sends, to the terminal device, signaling that carries a third sequence generation parameter or cyclic shift interval information.

Optionally, the terminal device selects one random access preamble sequence to be sent.

Optionally, the terminal device determines one random access preamble sequence based on indication information sent by a base station and sends the random access preamble sequence.

In this embodiment, a length of a CP of a symbol corresponding to the random access preamble sequence can support a coverage area of a cell in an unlicensed spectrum, and can make different random access preamble sequences orthogonal in a segmented manner in a frequency domain unit by using an orthogonal sequence code, thereby ensuring demodulation performance of a random access preamble sequence that occupies discrete resources in frequency domain.

In another possible manner, a PRACH includes one symbol. The symbol may be in a format of a symbol occupied by a random access preamble sequence format 4 shown in the foregoing Table 1. To be specific, a length of a CP of the symbol is 448·Ts, and a length of an information segment is 4096·Ts. The symbol occupies approximately two symbols in an NCP subframe format in time domain. Correspondingly, in frequency domain, each RB of N RBs includes 24 contiguous subcarriers, where a bandwidth of each subcarrier is 7500 Hz.

Optionally, the random access preamble sequence is mapped to the 24 subcarriers of each RB. Optionally, the random access preamble sequence is mapped to L contiguous subcarriers located at a central location of each RB. Of two sides of the central location of each RB, N1 subcarriers are reserved on one side and signal mapping is not performed thereon; and N2 subcarriers are reserved on the other side and signal mapping is not performed thereon. Optionally, the random access preamble sequence is mapped to 20 contiguous subcarriers located at the central location of each RB, and two subcarriers are reserved on either side of two sides of the central location of each RB and signal mapping is not performed thereon.

Optionally, a start moment of the symbol corresponding to the PRACH aligns with a start moment of a symbol of an NCP or ECP subframe. Optionally, an end moment of the symbol corresponding to the PRACH aligns with an end moment of a symbol of an NCP or ECP subframe. Considering that the terminal device first needs to detect whether a channel is idle when using a resource in an unlicensed spectrum, the $1^{st}$ symbol in a subframe may be used by the terminal device to perform LBT detection. Optionally, the start moment of the symbol corresponding to the PRACH aligns with a start moment of a second symbol of a subframe.

In this embodiment, for a manner of generating or sending the random access preamble sequence, refer to the manner of generating or sending the random access preamble sequence described above. Details are not described herein again.

In this embodiment, a length of a CP of a symbol corresponding to the random access preamble sequence can support a coverage area of a cell in an unlicensed spectrum, and can make different random access preamble sequences orthogonal in a segmented manner in a frequency domain unit by using an orthogonal sequence code, thereby ensuring demodulation performance of a random access preamble sequence that occupies discrete resources in frequency domain.

In still another possible manner, a PRACH includes M symbols. The M symbols are symbols in one ECP subframe, and M is greater than or equal to 1 and less than or equal to 14. A length of a CP of each symbol of the M symbols is 512·Ts. In frequency domain, each RB of N RBs includes 12 contiguous subcarriers, where a bandwidth of each subcarrier is 15000 Hz.

In this embodiment, for a manner of generating or sending the random access preamble sequence, refer to the manner of generating or sending the random access preamble sequence described above. Details are not described herein again.

Optionally, the PRACH and a PUSCH or PUCCH are multiplexed in a same subframe in a frequency division manner.

Specifically, that the PRACH and a PUSCH or PUCCH are multiplexed in a same subframe in a frequency division manner may include the following two manners:

(1) Both the PRACH and the PUSCH or PUCCH are multiplexed in an ECP subframe format in a subframe. Optionally, the random access preamble sequence (or in other words, the PRACH) is mapped to N RBs and occupies 12 subcarriers in each RB. (Refer to FIG. 4c.)

In this manner, in other words, the random access preamble sequence does not occupy all symbols, and a symbol may be reserved for LBT of the terminal device.

Optionally, the terminal device determines a subframe format of a subframe based on an indication message that is predefined or sent by the network device.

(2) The PRACH is multiplexed in an ECP subframe format in a subframe, and the PUSCH or PUCCH is multiplexed in an NCP subframe format in the subframe. To avoid interference between the PRACH and the PUSCH or PUCCH, optionally, the random access preamble sequence is mapped to 10 contiguous subcarriers located at a central location of each RB, and one subcarrier is reserved on either side of two sides of the central location of each RB and signal mapping is not performed thereon. (Refer to FIG. 4d.)

Similarly, in this manner, a symbol may also be reserved for LBT of the terminal device, to be specific, the random access preamble sequence does not occupy all symbols.

In this embodiment, a length of a CP of a symbol corresponding to the random access preamble sequence can support a coverage area of a cell in an unlicensed spectrum, and can make different random access preamble sequences orthogonal in a segmented manner in a frequency domain unit by using an orthogonal sequence code, thereby ensuring demodulation performance of a random access preamble sequence that occupies discrete resources in frequency domain.

Optionally, the first signal includes data information, to be specific, S symbols of the M symbols carry the data information, where S<M, and M>1. Optionally, the data information is uplink control information, and the uplink control information includes at least one type of HARQ information, channel state information, and scheduling request information.

Optionally, uplink control information is modulated to S first sequences of the M first sequences.

It should be noted that, for a manner of generating each first sequence of the M first sequences, refer to the description of the foregoing manner of generating the first sequence.

It should be noted that the signal sending method in this embodiment of the present disclosure is also applicable to an SRS, a DMRS of a PUCCH, or a DMRS of a PUSCH.

Optionally, each RB of N RBs in frequency domain includes 12 contiguous subcarriers, a bandwidth of each subcarrier is 15000 Hz, and the first signal is mapped to the 12 subcarriers in each RB.

Optionally, each symbol of the S symbols carries same before-coding original uplink control information, each RB of the N RBs carries same before-coding original uplink control information, and the 12 subcarriers in each RB also carry same before-coding original uplink control information.

Optionally, each symbol of the S symbols carries same before-coding original uplink control information, at least two RBs of the N RBs carry different before-coding original uplink control information, and the 12 subcarriers in each RB carry same before-coding original uplink control information.

Optionally, each symbol of the S symbols carries same before-coding original uplink control information, each RB of the N RBs carries same before-coding original uplink control information, and at least two subcarriers of the 12 subcarriers in each RB carry different before-coding original uplink control information.

Optionally, at least two symbols of the S symbols carry different before-coding original uplink control information, each RB of the N RBs carries same before-coding original uplink control information, and 12 subcarriers in each RB also carry same before-coding original uplink control information, where S>2.

Optionally, at least two symbols of the S symbols carry different before-coding original uplink control information, at least two RBs of the N RBs carry different before-coding original uplink control information, and 12 subcarriers in each RB carry same before-coding original uplink control information, where S>2.

In yet another possible manner of the signal sending method according to this embodiment of the present disclosure, each RB of the N RBs carries a same before-coding original HARQ information bit.

In this embodiment, the terminal device sends, in the N RBs, a same before-coding HARQ information bit. A transmit power of the HARQ information bit may be increased, thereby improving demodulation performance of the HARQ information bit.

Using FIG. 4e as an example, when the terminal device sends the first signal to the network device, the first signal occupies seven symbols in time domain and occupies four RBs in frequency domain. HARQ information is further transmitted in four symbols (which may correspond to a symbol 0, a symbol 1, a symbol 5, and a symbol 6 in FIG. 4e) of the seven symbols. In each symbol of the four symbols, same HARQ information is transmitted in an RB #0, an RB #4, an RB #8, and an RB #12.

In yet another possible manner of the signal sending method according to this embodiment of the present disclosure, N RBs include a first RB and a second RB. The first RB and the second RB respectively carry first HARQ information and second HARQ information, and the first HARQ information and the second HARQ information correspond to different carriers or subframes.

In this embodiment, the terminal device sends, in the N RBs, a plurality of before-coding HARQ information bits. HARQ information corresponding to different carriers or subframes may be fed back in a same subframe, thereby improving HARQ information feedback efficiency in a system with a relatively small quantity of uplink subframes.

Using FIG. 4f as an example, when providing, to a base station, feedback about whether information is successfully received, UE may first feed back HARQ information of different carriers of a same subframe and start feeding back different carriers of another subframe after feedback of one subframe is completed. In other words, the UE performs feedback by subframe and starts feeding back a next subframe only after feedback of all carriers in a subframe is completed.

For example, the UE needs to feed back carriers of two subframes (which are denoted as a subframe n and a subframe n+1 for ease of description). Assuming that RBs used in feedback are respectively an RB #0, an RB #1, an RB #2, and an RB #3, the UE feeds back a carrier #0 of the subframe n in the RB #0 and feeds back a carrier #1 of the subframe n in the RB #1, and feeds back a carrier #0 of the subframe n+1 in the RB #2 and feeds back a carrier #1 of the subframe n+1 in the RB #3.

103. The network device generates a second signal.

The second signal is used to receive the first signal sent by the terminal device, the second signal includes at least M first sequences, a length of each first sequence of the M first sequences is Z and each first sequence is obtained based on at least one second sequence whose length is L, the second sequence is a sequence in an orthogonal sequence group, the orthogonal sequence group includes at least two second sequences whose lengths are L, and any two second sequences in the orthogonal sequence group are mutually orthogonal, where Z=N·L, M≥1, N≥2, and Z, M, N, and L are all natural numbers.

It should be noted that a manner in which the network device generates the second signal is similar to a manner in which the terminal device generates the first signal. For a method for generating the second signal, refer to description of the foregoing manner for generating the first signal. Details are not described herein again.

In addition, the various possible manners in which the first signal occupies resources in time domain and frequency domain are also applicable to the second signal. In other words, for a manner in which the second signal occupies resources in time domain and frequency domain, refer to descriptions of the various possible manners in which the first signal occupies resources in time domain and frequency domain. For brevity, details are not described herein again.

It should be noted that a sequence included in the second signal includes at least the M first sequences. It is assumed that the second signal includes R sequences. If the M first sequences included in the first signal are considered as a first sequence set, and the R sequences included in the second signal are considered as a second sequence set, the second sequence set includes at least the first sequence set.

For example, the first signal includes three sequences (to be specific, three first sequences), which are respectively denoted as a sequence #a, a sequence #b, and a sequence #c for convenience of distinction and description. Then, the second signal includes at least the sequence #a, the sequence #b, and the sequence #c. For example, the second signal includes five sequences (to be specific, five fourth sequences), where the five fourth sequences may be the sequence #a, the sequence #b, the sequence #c, a sequence #d, and a sequence #e.

It should be understood that there is no particular order between step 103, step 101, and step 102. The numeral order of the steps in this specification is merely an example and should not be construed as unnecessary limitations on the signal sending method in this embodiment of the present disclosure. For example, alternatively, step 103 may be performed prior to step 102, or step 103 may be performed prior to step 101 or at the same time as step 101. To be specific, there is no mutual association or restriction between the generating the first signal by the terminal device and the generating the second signal by the network device. An order of performing the steps should be subject to internal logic of the signal sending method in this embodiment of the present disclosure.

104. The network device receives, based on the second signal, the first signal sent by the terminal device.

The second signal occupies M symbols in time domain, the second signal occupies N frequency domain units in frequency domain, each frequency domain unit of the N frequency domain units includes K contiguous subcarriers, and the second signal occupies L contiguous subcarriers in each frequency domain unit. The M sequences are in a one-to-one correspondence to the M symbols. K≥12, 1≤L≤K, and K is a natural number. When M>1, the M symbols are contiguous symbols.

Optionally, the second signal is a random access preamble sequence.

Similar to the foregoing process of receiving the signal, the network device performs correlation detection on a received random access preamble sequence and the random access preamble sequence generated by the network device, and determines a peak value. If the peak value exceeds a preset threshold, the network device determines that the random access preamble sequence is successfully received.

For example, the terminal device generates the first signal. The first signal includes four sequences (to be specific, four first sequences), and the four sequences are the same (which are denoted as a sequence #1 for ease of description). The network device generates the second signal, and the second signal includes five sequences. In the signal sending method according to this embodiment of the present disclosure, the five sequences include the foregoing sequence #1 and other four sequences other than the foregoing sequence #1.

Assuming that the terminal device sends the first signal to the network device, the first signal occupies four symbols in time domain, and one sequence (to be specific, a transmission sequence #1) is transmitted in each symbol. The network device first traverses the foregoing four symbols, to receive the four sequences #1 transmitted in the four symbols. Then, the network device may combine the four sequences #1 to obtain a sequence #1 with a relatively good signal to noise ratio. Finally, the network device performs correlation detection on the sequence #1 by using the five sequences in the generated second signal. If a correlation peak value between a sequence #5 and the sequence #1 exceeds the preset threshold, the network device considers that the terminal device transmits the sequence #1, to be specific, the sequence is successfully received.

Further optionally, the method further includes: sending, by the network device, a random sequence access response to the terminal device, to notify the terminal device that random access is successful.

Optionally, a to-be-received signal includes data information, to be specific, S symbols of the M symbols carry the data information, where S<M, and M>1. Optionally, the data information is uplink control information, and the uplink control information includes at least one type of HARQ information, channel state information, and scheduling request information.

Optionally, a method for receiving the first signal by the network device includes:

performing, by the network device based on a generated sequence, channel estimation on a symbol that is of the M symbols and that does not carry the uplink control information; and demodulating, based on a channel estimation result, the uplink control information carried on the S symbols of the M symbols.

In the prior art, a random access preamble sequence is mapped to discrete RBs in frequency domain. It is highly possible that a bandwidth occupied by the random access preamble sequence in frequency domain exceeds a coherence bandwidth of a channel. As a result, different random access preamble sequences are compromised in terms of orthogonality after undergoing channel fading. Therefore, the method for transmitting a random access preamble sequence according to this embodiment of the present disclosure can make different random access preamble sequences orthogonal in a segmented manner in a frequency domain unit by using an orthogonal sequence code, thereby ensuring demodulation performance of a random access preamble sequence that occupies discrete resources in frequency domain.

The foregoing describes in detail the signal sending method according to the embodiments of the present disclosure with reference to FIG. 1 to FIG. 5. The following describes a terminal device and a network device for transmitting a signal according to the embodiments of the present disclosure with reference to FIG. 6 and FIG. 7.

Figure 6:
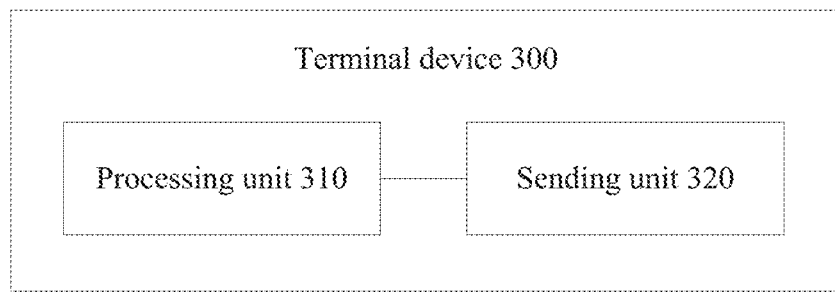
FIG. 6 shows a schematic block diagram of a terminal device for transmitting a signal according to an embodiment of the present disclosure.

FIG. 6 shows a schematic block diagram of a terminal device 300 for transmitting a signal according to an embodiment of the present disclosure. As shown in FIG. 6, the terminal device 300 includes a processing unit 310 and a sending unit 320.

The processing unit 310 is configured to generate a first signal, where the first signal includes M first sequences, a length of each first sequence of the M first sequences is Z and each first sequence is obtained based on at least one second sequence whose length is L, the second sequence is a sequence in an orthogonal sequence group, the orthogonal sequence group includes at least two second sequences whose lengths are L, and any two second sequences in the orthogonal sequence group are mutually orthogonal.

The sending unit 320 is configured to send the first signal, where the first signal occupies M symbols in time domain, the first signal occupies N frequency domain units in frequency domain, each frequency domain unit of the N frequency domain units includes K contiguous subcarriers, the first signal occupies L contiguous subcarriers in each frequency domain unit, and the M sequences are in a one-to-one correspondence to the M symbols, where Z=N·L, M≥1, N≥2, K≥12, and 1≤L≤K; Z, M, N, K, and L are all natural numbers; and when M>1, the M symbols are contiguous symbols.

Optionally, in an embodiment, each first sequence of the M first sequences is obtained based on a third sequence whose length is Z and any second sequence of the at least one second sequence.

Optionally, in an embodiment, a bandwidth of each frequency domain unit of the N frequency domain units is 180000 Hz. That each frequency domain unit includes K contiguous subcarriers includes at least one of the following cases:

each frequency domain unit includes 144 contiguous subcarriers, where a bandwidth of each subcarrier is 1250 Hz;

each frequency domain unit includes 72 contiguous subcarriers, where a bandwidth of each subcarrier is 2500 Hz;

each frequency domain unit includes 36 contiguous subcarriers, where a bandwidth of each subcarrier is 5000 Hz;

each frequency domain unit includes 24 contiguous subcarriers, where a bandwidth of each subcarrier is 7500 Hz; and each frequency domain unit includes 12 contiguous subcarriers, where a bandwidth of each subcarrier is 15000 Hz.

Optionally, in an embodiment, that the first signal occupies M symbols in time domain includes at least one of the following cases:

the first signal occupies 1 symbol in time domain;

the first signal occupies 2 contiguous symbols in time domain;

the first signal occupies 4 contiguous symbols in time domain;

the first signal occupies 12 contiguous symbols in time domain; and the first signal occupies 14 contiguous symbols in time domain.

Optionally, in an embodiment, a length of a cyclic prefix CP of at least the $1^{st}$ symbol of the M symbols is greater than 160·Ts, where Ts=1/(15000×2048) seconds.

Optionally, in an embodiment, each frequency domain unit of the N frequency domain units includes 12 contiguous subcarriers, the bandwidth of each subcarrier is 15000 Hz, the first signal occupies 10 contiguous subcarriers located at a central location of each frequency domain unit in frequency domain, and one subcarrier located on either side of two sides of the central location of each frequency domain unit does not carry a signal.

Optionally, in an embodiment, each frequency domain unit of the N frequency domain units includes 144 contiguous subcarriers, the bandwidth of each subcarrier is 1250 Hz, the first signal occupies 1 symbol in time domain, the first signal occupies 120 contiguous subcarriers located at a central location of each frequency domain unit in frequency domain, and 12 contiguous subcarriers located on either side of two sides of the central location of each frequency domain unit do not carry a signal.

Optionally, in an embodiment, S symbols of the M symbols carry uplink control information, and the uplink control information includes at least one type of hybrid automatic repeat request HARQ information, channel state information, and scheduling request information, where S<M, and M>1.

Optionally, in an embodiment, the uplink control information is HARQ information, the N frequency domain units include a first frequency domain unit and a second frequency domain unit, the first frequency domain unit and the second frequency domain unit respectively carry first HARQ information and second HARQ information, and the first HARQ information and the second HARQ information correspond to different carriers or subframes.

Optionally, in an embodiment, when N>2, frequency domain spacings between any two adjacent frequency domain units of the N frequency domain units are equal.

The terminal device 300 for transmitting a signal according to this embodiment of the present disclosure may correspond to the terminal device in the signal sending method according to the embodiments of the present disclosure. In addition, the units in the terminal device 300 and the foregoing other operations and/or functions are respectively intended to implement the steps performed by the terminal device in FIG. 2. For brevity, details are not described herein again.

The terminal device for transmitting a signal according to this embodiment of the present disclosure can make different random access preamble sequences orthogonal in a segmented manner in a frequency domain unit by using an orthogonal sequence code, thereby ensuring demodulation performance of a random access preamble sequence that occupies discrete resources in frequency domain.

Figure 7:
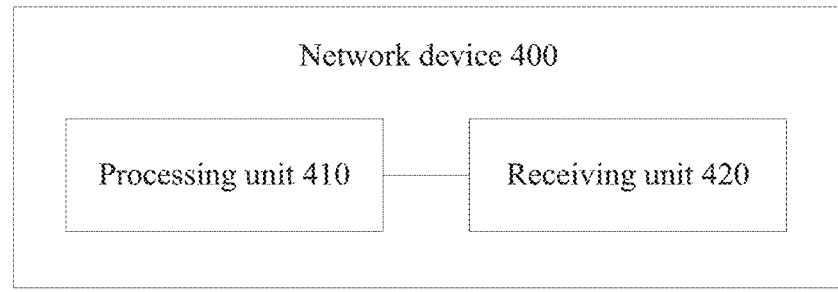
FIG. 7 shows a schematic block diagram of a network device for transmitting a signal according to another embodiment of the present disclosure.

FIG. 7 shows a schematic block diagram of a network device 400 for transmitting a signal according to an embodiment of the present disclosure. As shown in FIG. 7, the network device 400 includes a processing unit 410 and a receiving unit 420.

The processing unit 410 is configured to generate a second signal, where the second signal is used to receive a first signal sent by a terminal device, the second signal includes at least M first sequences, a length of each first sequence of the M first sequences is Z and each first sequence is obtained based on at least one second sequence whose length is L, the second sequence is a sequence in an orthogonal sequence group, the orthogonal sequence group includes at least two second sequences whose lengths are L, and any two second sequences in the orthogonal sequence group are mutually orthogonal.

The receiving unit 420 is configured to receive, based on the second signal generated by the processing unit 410, the first signal sent by the terminal device, where the first signal occupies M symbols in time domain, the first signal occupies N frequency domain units in frequency domain, each frequency domain unit includes K contiguous subcarriers, the first signal occupies L contiguous subcarriers in each frequency domain unit, and the M sequences are in a one-to-one correspondence to the M symbols, where $Z=N \cdot L$, $M \geq 1$, $N \geq 2$, $K \geq 12$, and $1 \leq L \leq K$; Z, M, N, K, and L are all natural numbers; and when $M>1$, the M symbols are contiguous symbols.

Optionally, in an embodiment, each first sequence of the M first sequences is obtained based on a third sequence whose length is Z and any second sequence of the at least one second sequence.

Optionally, in an embodiment, a bandwidth of each frequency domain unit of the N frequency domain units is 180000 Hz. That each frequency domain unit includes K contiguous subcarriers includes at least one of the following cases:

each frequency domain unit includes 144 contiguous subcarriers, where a bandwidth of each subcarrier is 1250 Hz;

each frequency domain unit includes 72 contiguous subcarriers, where a bandwidth of each subcarrier is 2500 Hz;

each frequency domain unit includes 36 contiguous subcarriers, where a bandwidth of each subcarrier is 5000 Hz;

each frequency domain unit includes 24 contiguous subcarriers, where a bandwidth of each subcarrier is 7500 Hz; and each frequency domain unit includes 12 contiguous subcarriers, where a bandwidth of each subcarrier is 15000 Hz.

Optionally, in an embodiment, that the first signal occupies M symbols in time domain includes at least one of the following cases:

the first signal occupies 1 symbol in time domain;

the first signal occupies 2 contiguous symbols in time domain;

the first signal occupies 4 contiguous symbols in time domain;

the first signal occupies 12 contiguous symbols in time domain; and the first signal occupies 14 contiguous symbols in time domain.

Optionally, in an embodiment, a length of a cyclic prefix CP of at least the $1^{st}$ symbol of the M symbols is greater than $160 \cdot Ts$, where $Ts=1/(15000 \times 2048)$ seconds.

Optionally, in an embodiment, each frequency domain unit of the N frequency domain units includes 12 contiguous subcarriers, the bandwidth of each subcarrier is 15000 Hz, the first signal occupies 10 contiguous subcarriers located at a central location of each frequency domain unit in frequency domain, and one subcarrier located on either side of two sides of the central location of each frequency domain unit does not carry a signal.

Optionally, in an embodiment, each frequency domain unit of the N frequency domain units includes 144 contiguous subcarriers, the bandwidth of each subcarrier is 1250 Hz, the first signal occupies 1 symbol in time domain, the first signal occupies 120 contiguous subcarriers located at a central location of each frequency domain unit in frequency domain, and 12 contiguous subcarriers located on either side of two sides of the central location of each frequency domain unit do not carry a signal.

Optionally, in an embodiment, S symbols of the M symbols carry uplink control information, and the uplink control information includes at least one type of hybrid automatic repeat request HARQ information, channel state information, and scheduling request information, where $S<M$, and $M>1$.

Optionally, in an embodiment, the uplink control information is HARQ information, the N frequency domain units include a first frequency domain unit and a second frequency domain unit, the first frequency domain unit and the second frequency domain unit respectively carry first HARQ information and second HARQ information, and the first HARQ information and the second HARQ information correspond to different carriers or subframes.

Optionally, in an embodiment, when $N>2$, frequency domain spacings between any two adjacent frequency domain units of the N frequency domain units are equal.

The network device 400 for transmitting a signal according to this embodiment of the present disclosure may correspond to the network device in the signal sending method according to the embodiments of the present disclosure. In addition, the units in the network device 400 and the foregoing other operations and/or functions are respectively intended to implement the steps performed by the network device in FIG. 2. For brevity, details are not described herein again.

The network device for transmitting a signal according to this embodiment of the present disclosure can make different random access preamble sequences orthogonal in a segmented manner in a frequency domain unit by using an orthogonal sequence code, thereby ensuring demodulation performance of a random access preamble sequence that occupies discrete resources in frequency domain.

The foregoing describes in detail the terminal device and the network device for transmitting a signal according to the embodiments of the present disclosure with reference to FIG. 6 and FIG. 7. The following describes a device for transmitting a signal according to the embodiments of the present disclosure with reference to FIG. 8 and FIG. 9.

Figure 8:
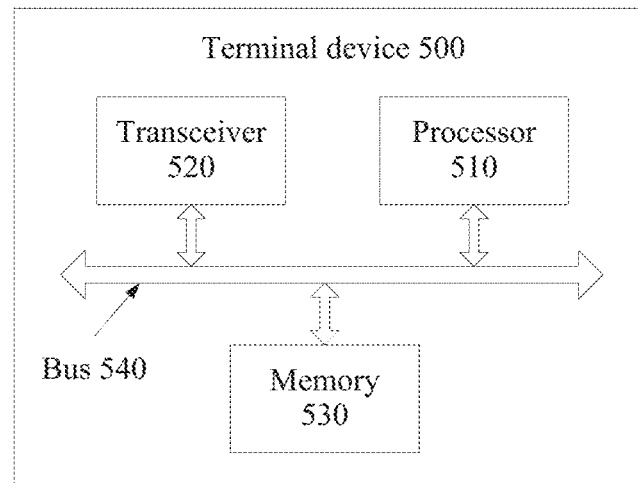
FIG. 8 shows a schematic structural block diagram of a device for transmitting a signal according to an embodiment of the present disclosure.

FIG. 8 shows a schematic structural block diagram of a device 500 for transmitting a signal according to an embodiment of the present disclosure. As shown in FIG. 8, the device 500 includes a processor 510, a transceiver 520, and a memory 530. Optionally, the device 500 further includes a bus system 540. The processor 510, the transceiver 520, and the memory 530 may be connected by using the bus system 540. The memory 530 may be configured to store an instruction.

The processor 510 is configured to execute the instruction stored in the memory 530, and is configured to generate a first signal, where the first signal includes M first sequences, a length of each first sequence of the M first sequences is Z and each first sequence is obtained based on at least one second sequence whose length is L, the second sequence is a sequence in an orthogonal sequence group, the orthogonal sequence group includes at least two second sequences whose lengths are L, and any two second sequences in the orthogonal sequence group are mutually orthogonal.

The transceiver 520 is configured to send the first signal generated by the processor 510, where the first signal occupies M symbols in time domain, the first signal occupies N frequency domain units in frequency domain, each frequency domain unit of the N frequency domain units includes K contiguous subcarriers, the first signal occupies L contiguous subcarriers in each frequency domain unit, and the M sequences are in a one-to-one correspondence to the M symbols, where $Z=N \cdot L$, $M \geq 1$, $N \geq 2$, $K \geq 12$, and $1 \leq L \leq K$; Z, M, N, K, and L are all natural numbers; and when $M>1$, the M symbols are contiguous symbols.

Optionally, in an embodiment, each first sequence of the M first sequences is obtained based on a third sequence whose length is Z and any second sequence of the at least one second sequence.

Optionally, in an embodiment, a bandwidth of each frequency domain unit of the N frequency domain units is 180000 Hz. That each frequency domain unit includes K contiguous subcarriers includes at least one of the following cases:

each frequency domain unit includes 144 contiguous subcarriers, where a bandwidth of each subcarrier is 1250 Hz;

each frequency domain unit includes 72 contiguous subcarriers, where a bandwidth of each subcarrier is 2500 Hz;

each frequency domain unit includes 36 contiguous subcarriers, where a bandwidth of each subcarrier is 5000 Hz;

each frequency domain unit includes 24 contiguous subcarriers, where a bandwidth of each subcarrier is 7500 Hz; and each frequency domain unit includes 12 contiguous subcarriers, where a bandwidth of each subcarrier is 15000 Hz.

Optionally, in an embodiment, that the first signal occupies M symbols in time domain includes at least one of the following cases:

the first signal occupies 1 symbol in time domain;

the first signal occupies 2 contiguous symbols in time domain;

the first signal occupies 4 contiguous symbols in time domain;

the first signal occupies 12 contiguous symbols in time domain; and the first signal occupies 14 contiguous symbols in time domain.

Optionally, in an embodiment, a length of a cyclic prefix CP of at least the $1^{st}$ symbol of the M symbols is greater than 160·Ts, where Ts=1/(15000×2048) seconds.

Optionally, in an embodiment, each frequency domain unit of the N frequency domain units includes 12 contiguous subcarriers, the bandwidth of each subcarrier is 15000 Hz, the first signal occupies 10 contiguous subcarriers located at a central location of each frequency domain unit in frequency domain, and one subcarrier located on either side of two sides of the central location of each frequency domain unit does not carry a signal.

Optionally, in an embodiment, each frequency domain unit of the N frequency domain units includes 144 contiguous subcarriers, the bandwidth of each subcarrier is 1250 Hz, the first signal occupies 1 symbol in time domain, the first signal occupies 120 contiguous subcarriers located at a central location of each frequency domain unit in frequency domain, and 12 contiguous subcarriers located on either side of two sides of the central location of each frequency domain unit do not carry a signal.

Optionally, in an embodiment, S symbols of the M symbols carry uplink control information, and the uplink control information includes at least one type of hybrid automatic repeat request HARQ information, channel state information, and scheduling request information, where S<M, and M>1.

Optionally, in an embodiment, the uplink control information is HARQ information the N frequency domain units include a first frequency domain unit and a second frequency domain unit, the first frequency domain unit and the second frequency domain unit respectively carry first HARQ information and second HARQ information, and the first HARQ information and the second HARQ information correspond to different carriers or subframes.

Optionally, in an embodiment, when N>2, frequency domain spacings between any two adjacent frequency domain units of the N frequency domain units are equal.

It should be understood that, in this embodiment of the present disclosure, the processor 510 may be a central processing unit (CPU). Alternatively, the processor 510 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The memory 530 may include a read-only memory and a random access memory, and provide the instruction and data to the processor 510. A part of the processor 510 may further include a nonvolatile random access memory. For example, the processor 510 may further store information about a device type.

In addition to including a data bus, the bus system 540 may further include a power bus, a control bus, a status signal bus, and the like. However, for clarity of description, various buses are denoted as the bus system 540 in the figure.

In an implementation process, the steps of the foregoing method may be completed using a hardware integrated logic circuit or an instruction in a software form in the processor 510. The steps of the signal sending method disclosed with reference to the embodiments of the present disclosure may be directly performed and completed by a hardware processor or performed and completed by a combination of hardware and software modules in the processor. The software module may be located in a mature storage medium in the art, such as a random memory, a flash memory, a read-only memory, a programmable read-only memory or an electrically erasable programmable memory, or a register. The storage medium is located in the memory 530, and the processor 510 reads information in the memory 530 and completes the steps of the foregoing method in combination with the hardware of the processor. To avoid repetition, details are not described herein.

The device 500 for transmitting a signal according to this embodiment of the present disclosure may correspond to the terminal device in the signal sending method according to the embodiments of the present disclosure. In addition, the units in the device 500 and the foregoing other operations and/or functions are respectively intended to implement the steps performed by the terminal device in FIG. 2. For brevity, details are not described herein again.

The device for transmitting a signal according to this embodiment of the present disclosure can make different random access preamble sequences orthogonal in a segmented manner in a frequency domain unit by using an orthogonal sequence code, thereby ensuring demodulation performance of a random access preamble sequence that occupies discrete resources in frequency domain.

Figure 9:
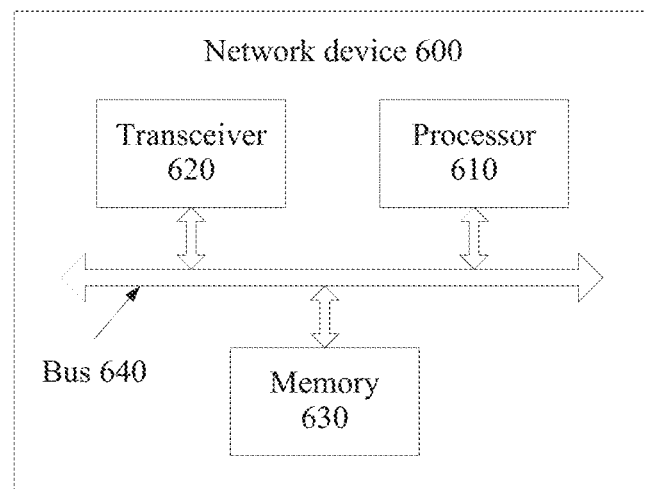
FIG. 9 shows a schematic structural block diagram of a device for transmitting a signal according to another embodiment of the present disclosure.

FIG. 9 shows a schematic structural block diagram of a device for transmitting a signal according to another embodiment of the present disclosure. As shown in FIG. 9, a device 600 includes a processor 610, a transceiver 620, and a memory 630. Optionally, the device 600 further includes a bus system 640. The processor 610, the transceiver 620, and the memory 630 may be connected by using the bus system 640. The memory 630 may be configured to store an instruction. The processor 610 is configured to execute the instruction stored in the memory 630, and is configured to generate a second signal, where the second signal is used to receive a first signal sent by a terminal device, the second signal includes at least M first sequences, a length of each first sequence of the M first sequences is Z and each first sequence is obtained based on at least one second sequence whose length is L, the second sequence is a sequence in an orthogonal sequence group, the orthogonal sequence group includes at least two second sequences whose lengths are L, and any two second sequences in the orthogonal sequence group are mutually orthogonal.

The transceiver 620 is configured to receive, based on the second signal generated by the processor 610, the first signal sent by the terminal device, where the first signal occupies M symbols in time domain, the first signal occupies N frequency domain units in frequency domain, each frequency domain unit includes K contiguous subcarriers, the first signal occupies L contiguous subcarriers in each frequency domain unit, and the M sequences are in a one-to-one correspondence to the M symbols, where Z=N·L, M≥1, N≥2, K≥12, and 1≤L≤K; Z, M, N, K, and L are all natural numbers; and when M>1, the M symbols are contiguous symbols.

Optionally, in an embodiment, each first sequence of the M first sequences is obtained based on a third sequence whose length is Z and any second sequence of the at least one second sequence.

Optionally, in an embodiment, a bandwidth of each frequency domain unit of the N frequency domain units is 180000 Hz. That each frequency domain unit includes K contiguous subcarriers includes at least one of the following cases:

each frequency domain unit includes 144 contiguous subcarriers, where a bandwidth of each subcarrier is 1250 Hz;

each frequency domain unit includes 72 contiguous subcarriers, where a bandwidth of each subcarrier is 2500 Hz;

each frequency domain unit includes 36 contiguous subcarriers, where a bandwidth of each subcarrier is 5000 Hz;

each frequency domain unit includes 24 contiguous subcarriers, where a bandwidth of each subcarrier is 7500 Hz; and each frequency domain unit includes 12 contiguous subcarriers, where a bandwidth of each subcarrier is 15000 Hz.

Optionally, in an embodiment, that the first signal occupies M symbols in time domain includes at least one of the following cases:

the first signal occupies 1 symbol in time domain;

the first signal occupies 2 contiguous symbols in time domain;

the first signal occupies 4 contiguous symbols in time domain;

the first signal occupies 12 contiguous symbols in time domain; and the first signal occupies 14 contiguous symbols in time domain.

Optionally, in an embodiment, a length of a cyclic prefix CP of at least the $1^{st}$ symbol of the M symbols is greater than 160·Ts, where Ts=1/(15000×2048) seconds.

Optionally, in an embodiment, each frequency domain unit of the N frequency domain units includes 12 contiguous subcarriers, the bandwidth of each subcarrier is 15000 Hz, the first signal occupies 10 contiguous subcarriers located at a central location of each frequency domain unit in frequency domain, and one subcarrier located on either side of two sides of the central location of each frequency domain unit does not carry a signal.

Optionally, in an embodiment, each frequency domain unit of the N frequency domain units includes 144 contiguous subcarriers, the bandwidth of each subcarrier is 1250 Hz, the first signal occupies 1 symbol in time domain, the first signal occupies 120 contiguous subcarriers located at a central location of each frequency domain unit in frequency domain, and 12 contiguous subcarriers located on either side of two sides of the central location of each frequency domain unit do not carry a signal.

Optionally, in an embodiment, S symbols of the M symbols carry uplink control information, and the uplink control information includes at least one type of hybrid automatic repeat request HARQ information, channel state information, and scheduling request information, where S<M, and M>1.

Optionally, in an embodiment, the uplink control information is HARQ information, the N frequency domain units include a first frequency domain unit and a second frequency domain unit, the first frequency domain unit and the second frequency domain unit respectively carry first HARQ information and second HARQ information, and the first HARQ information and the second HARQ information correspond to different carriers or subframes.

Optionally, in an embodiment, when N>2, frequency domain spacings between any two adjacent frequency domain units of the N frequency domain units are equal.

It should be understood that, in this embodiment of the present disclosure, the processor 610 may be a central processing unit (central processing unit, CPU). Alternatively, the processor 610 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The memory 630 may include a read-only memory and a random access memory, and provide the instruction and data to the processor 610. A part of the processor 610 may further include a nonvolatile random access memory. For example, the processor 610 may further store information about a device type.

In addition to including a data bus, the bus system 640 may further include a power bus, a control bus, a status signal bus, and the like. However, for clarity of description, various buses are denoted as the bus system 640 in the figure.

In an implementation process, the steps of the foregoing method may be completed using a hardware integrated logic circuit or an instruction in a software form in the processor 610. The steps of the signal sending method disclosed with reference to the embodiments of the present disclosure may be directly performed and completed by a hardware processor or performed and completed by a combination of hardware and software modules in the processor. The software module may be located in a mature storage medium in the art, such as a random memory, a flash memory, a read-only memory, a programmable read-only memory or an electrically erasable programmable memory, or a register. The storage medium is located in the memory 630, and the processor 610 reads information in the memory 630 and completes the steps of the foregoing method in combination with the hardware of the processor. To avoid repetition, details are not described herein.

The device 600 for transmitting a signal according to this embodiment of the present disclosure may correspond to the network device in the signal sending method according to the embodiments of the present disclosure. In addition, the units in the device 600 and the foregoing other operations and/or functions are respectively intended to implement the steps performed by the network device in FIG. 2.

The device for transmitting a signal according to this embodiment of the present disclosure can make different random access preamble sequences orthogonal in a segmented manner in a frequency domain unit by using an orthogonal sequence code, thereby ensuring demodulation performance of a random access preamble sequence that occupies discrete resources in frequency domain.

It should be understood that sequence numbers of the foregoing processes do not mean execution sequences in various embodiments of the present disclosure. The execution sequences of the processes should be determined based on functions and internal logic of the processes, and should not be construed as any limitation on the implementation processes of the embodiments of the present disclosure.

Persons of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present disclosure.

It may be clearly understood by persons skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one place, or may be distributed on a plurality of network units. Some or all of the units may be selected based on actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present disclosure. The storage medium includes: any medium that can store program code, such as a USB flash drive, a removable hard disk, a read-only memory (ROM), a random access memory (RAM), a magnetic disk, or an optical disc.

The descriptions are only specific implementations of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A method, comprising:
generating, by a terminal device, a first signal, wherein the first signal comprises M first sequences, a length of each first sequence of the M first sequences is Z and each first sequence is obtained based on at least one second sequence whose length is L, the second sequence is a sequence in an orthogonal sequence group, the orthogonal sequence group comprises at least two second sequences whose lengths are L, and any two second sequences in the orthogonal sequence group are mutually orthogonal; and
sending, by the terminal device, the first signal, wherein the first signal occupies M symbols in a time domain, the first signal occupies N frequency domain units in a frequency domain, each frequency domain unit of the N frequency domain units comprises K contiguous subcarriers, the first signal occupies L contiguous subcarriers in each frequency domain unit, and the M sequences are in a one-to-one correspondence to the M symbols, wherein Z=N·L, M≥1, N≥2, K≥12, and 1≤L≤K, wherein Z, M, N, K, and L are all natural numbers, and when M>1, the M symbols are contiguous symbols.

2. The method according to claim 1, wherein each first sequence of the M first sequences is obtained based on a third sequence whose length is Z and the at least one second sequence.

3. The method according to claim 1, wherein a bandwidth of each frequency domain unit of the N frequency domain units is 180000 Hz, and that each frequency domain unit comprises K contiguous subcarriers comprises at least one of the following:
each frequency domain unit comprises 144 contiguous subcarriers, wherein a bandwidth of each subcarrier is 1250 Hz;
each frequency domain unit comprises 72 contiguous subcarriers, wherein a bandwidth of each subcarrier is 2500 Hz;
each frequency domain unit comprises 36 contiguous subcarriers, wherein a bandwidth of each subcarrier is 5000 Hz;
each frequency domain unit comprises 24 contiguous subcarriers, wherein a bandwidth of each subcarrier is 7500 Hz; and
each frequency domain unit comprises 12 contiguous subcarriers, wherein a bandwidth of each subcarrier is 15000 Hz.

4. The method according to claim 1, wherein that the first signal occupies M symbols in the time domain comprises at least one of the following:

the first signal occupies 1 symbol in the time domain;
the first signal occupies 2 contiguous symbols in the time domain;
the first signal occupies 4 contiguous symbols in the time domain;
the first signal occupies 12 contiguous symbols in the time domain; and
the first signal occupies 14 contiguous symbols in the time domain.

5. The method according to claim 1, wherein a length of a cyclic prefix CP of at least the first symbol of the M symbols is greater than 160·Ts, wherein Ts=1/(15000×2048) seconds.

6. The method according to claim 5, wherein each frequency domain unit of the N frequency domain units comprises 12 contiguous subcarriers, a bandwidth of each subcarrier is 15000 Hz, the first signal occupies 10 contiguous subcarriers located at a central location of each frequency domain unit in the frequency domain, and one subcarrier located on either side of two sides of the central location of each frequency domain unit does not carry a signal.

7. The method according to claim 5, wherein each frequency domain unit of the N frequency domain units comprises 144 contiguous subcarriers, a bandwidth of each subcarrier is 1250 Hz, the first signal occupies 1 symbol in time domain, the first signal occupies 120 contiguous subcarriers located at a central location of each frequency domain unit in the frequency domain, and each 12 contiguous subcarriers located on either side of two sides of the central location of each frequency domain unit do not carry a signal.

8. A method, comprising:
generating, by a network device, a second signal for receiving a first signal sent by a terminal device, the second signal comprising at least M first sequences, a length of each first sequence of the M first sequences is Z and each first sequence is obtained based on at least one second sequence whose length is L, the second sequence is a sequence in an orthogonal sequence group, the orthogonal sequence group comprises at least two second sequences whose lengths are L, and any two second sequences in the orthogonal sequence group are mutually orthogonal; and
receiving, by the network device based on the second signal, the first signal sent by the terminal device, wherein the first signal occupies M symbols in a time domain, the first signal occupies N frequency domain units in a frequency domain, each frequency domain unit comprises K contiguous subcarriers, the first signal occupies L contiguous subcarriers in each frequency domain unit, and the M sequences are in a one-to-one correspondence to the M symbols, wherein Z=N·L, M≥1, N≥2, K≥12, and 1≤L≤K; Z, M, N, K, and L are all natural numbers, and when M>1, the M symbols are contiguous symbols.

9. The method according to claim 8, wherein each sequence of the M sequences is obtained based on a third sequence whose length is Z and the second sequence.

10. The method according to claim 8, wherein a bandwidth of each frequency domain unit of the N frequency domain units is 180000 Hz, and that each frequency domain unit comprises K contiguous subcarriers comprises at least one of the following:
each frequency domain unit comprises 144 contiguous subcarriers, wherein a bandwidth of each subcarrier is 1250 Hz;
each frequency domain unit comprises 72 contiguous subcarriers, wherein a bandwidth of each subcarrier is 2500 Hz;
each frequency domain unit comprises 36 contiguous subcarriers, wherein a bandwidth of each subcarrier is 5000 Hz;
each frequency domain unit comprises 24 contiguous subcarriers, wherein a bandwidth of each subcarrier is 7500 Hz; and
each frequency domain unit comprises 12 contiguous subcarriers, wherein a bandwidth of each subcarrier is 15000 Hz.

11. The method according to claim 10, wherein that the first signal occupies M symbols in time domain comprises at least one of the following:
the first signal occupies 1 symbol in the time domain;
the first signal occupies 2 contiguous symbols in the time domain;
the first signal occupies 4 contiguous symbols in the time domain;
the first signal occupies 12 contiguous symbols in the time domain; and
the first signal occupies 14 contiguous symbols in the time domain.

12. The method according to claim 8, wherein a length of a cyclic prefix CP of at least the first symbol of the M symbols is greater than 160·Ts, wherein Ts=1/(15000×2048) seconds.

13. The method according to claim 12, wherein each frequency domain unit of the N frequency domain units comprises 12 contiguous subcarriers, a bandwidth of each subcarrier is 15000 Hz, the first signal occupies 10 contiguous subcarriers located at a central location of each frequency domain unit in the frequency domain, and one subcarrier located on either side of two sides of the central location of each frequency domain unit does not carry the first signal.

14. The method according to claim 12, wherein each frequency domain unit of the N frequency domain units comprises 144 contiguous subcarriers, a bandwidth of each subcarrier is 1250 Hz, the first signal occupies 1 symbol in the time domain, the first signal occupies 120 contiguous subcarriers located at a central location of each frequency domain unit in the frequency domain, and each 12 contiguous subcarriers located on either side of two sides of the central location of each frequency domain unit do not carry the first signal.

15. An apparatus, comprising:
a processor;
a storage medium comprising executable instructions which, when executed by the processor, cause the apparatus to:
generate a first signal, wherein the first signal comprises M first sequences, a length of each first sequence of the M first sequences is Z and each first sequence is obtained based on at least one second sequence whose length is L, the second sequence is a sequence in an orthogonal sequence group, the orthogonal sequence group comprises at least two second sequences whose lengths are L, and any two second sequences in the orthogonal sequence group are mutually orthogonal, and
send the first signal, wherein the first signal occupies M symbols in time domain, the first signal occupies N frequency domain units in a frequency domain, each frequency domain unit of the N frequency domain units comprises K contiguous subcarriers, the first signal occupies L contiguous subcarriers in each frequency domain unit, and the M sequences are in a one-to-one correspondence to the M symbols, wherein $Z=N \cdot L$, $M \geq 1$, $N \geq 2$, $K \geq 12$, and $1 \leq L \leq K$; Z, M, N, K, and L are all natural numbers, and when $M>1$, the M symbols are contiguous symbols.

16. The apparatus according to claim 15, wherein each first sequence of the M first sequences is obtained based on a third sequence whose length is Z and the at least one second sequence.

17. The apparatus according to claim 15, wherein a bandwidth of each frequency domain unit of the N frequency domain units is 180000 Hz, and that each frequency domain unit comprises K contiguous subcarriers comprises at least one of the following:
- each frequency domain unit comprises 144 contiguous subcarriers, wherein a bandwidth of each subcarrier is 1250 Hz;
- each frequency domain unit comprises 72 contiguous subcarriers, wherein a bandwidth of each subcarrier is 2500 Hz;
- each frequency domain unit comprises 36 contiguous subcarriers, wherein a bandwidth of each subcarrier is 5000 Hz;
- each frequency domain unit comprises 24 contiguous subcarriers, wherein a bandwidth of each subcarrier is 7500 Hz; and
- each frequency domain unit comprises 12 contiguous subcarriers, wherein a bandwidth of each subcarrier is 15000 Hz.

18. The apparatus according to claim 15, wherein that the first signal occupies M symbols in time domain comprises at least one of the following:
- the first signal occupies 1 symbol in the time domain;
- the first signal occupies 2 contiguous symbols in the time domain;
- the first signal occupies 4 contiguous symbols in the time domain;
- the first signal occupies 12 contiguous symbols in the time domain; and
- the first signal occupies 14 contiguous symbols in the time domain.

19. The apparatus according to claim 15, wherein a length of a cyclic prefix CP of at least the first symbol of the M symbols is greater than $160 \cdot Ts$, wherein $Ts=1/(15000 \times 2048)$ seconds.

20. The apparatus according to claim 19, wherein each frequency domain unit of the N frequency domain units comprises 12 contiguous subcarriers, a bandwidth of each subcarrier is 15000 Hz, the first signal occupies 10 contiguous subcarriers located at a central location of each frequency domain unit in the frequency domain, and one subcarrier located on either side of two sides of the central location of each frequency domain unit does not carry a signal.

* * * * *